US011413739B2

(12) United States Patent
Lee et al.

(10) Patent No.: US 11,413,739 B2
(45) Date of Patent: Aug. 16, 2022

(54) COMMUNICATION ROBOT

(71) Applicant: LG ELECTRONICS INC., Seoul (KR)

(72) Inventors: Younghwan Lee, Seoul (KR); Daekee Shin, Seoul (KR); Seungwoo Maeng, Seoul (KR); Taesu Park, Seoul (KR); Yoonho Shin, Seoul (KR); Seihyun Cho, Seoul (KR); Hyunjung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 16/499,447

(22) PCT Filed: Mar. 30, 2018

(86) PCT No.: PCT/KR2018/003753
§ 371 (c)(1),
(2) Date: Sep. 30, 2019

(87) PCT Pub. No.: WO2018/182347
PCT Pub. Date: Oct. 4, 2018

(65) Prior Publication Data
US 2020/0023512 A1 Jan. 23, 2020

(30) Foreign Application Priority Data
Mar. 31, 2017 (KR) .................. 10-2017-0042084

(51) Int. Cl.
B25J 9/16 (2006.01)
B25J 9/00 (2006.01)

(52) U.S. Cl.
CPC ........... *B25J 9/0009* (2013.01); *B25J 9/1697* (2013.01)

(58) Field of Classification Search
CPC ...................................... B25J 9/00; B25J 9/16
See application file for complete search history.

(56) References Cited

U.S. PATENT DOCUMENTS

2008/0095395 A1* 4/2008 Pieklik .................. A61H 33/60
381/387
2009/0173561 A1 7/2009 Moriguchi et al.
(Continued)

FOREIGN PATENT DOCUMENTS

JP 2016101441 A * 6/2016
KR 10-2009-0005238 1/2009
(Continued)

OTHER PUBLICATIONS

International Search Report dated Jul. 30, 2018 issued in Application No. PCT/KR2018/003753.

*Primary Examiner* — Kira Nguyen
(74) *Attorney, Agent, or Firm* — Ked & Associates, LLP

(57) ABSTRACT

Disclosed is a communication robot including a support body disposed at the lower side, a main body supported by the support body so as to be rotatable about a first spin rotation axis in the leftward-rightward direction, the main body being configured such that the upper part of the main body performs an inclining operation relative to the lower part of the main body, and a display body supported by the main body so as to be rotatable about a second spin rotation axis in the leftward-rightward direction, the display body being configured to output an image.

13 Claims, 26 Drawing Sheets

(56) References Cited

U.S. PATENT DOCUMENTS

| | | |
|---|---|---|
| 2010/0175496 A1 | 7/2010 | Kim et al. |
| 2012/0173018 A1* | 7/2012 | Allen .................... G05D 1/0274 |
| | | 700/245 |
| 2013/0061709 A1 | 3/2013 | Kim et al. |
| 2016/0151917 A1 | 6/2016 | Faridi et al. |
| 2016/0188977 A1* | 6/2016 | Kearns ................. G05D 1/0274 |
| | | 348/113 |
| 2018/0364870 A1* | 12/2018 | Mei .......................... B25J 9/161 |
| 2019/0054626 A1* | 2/2019 | Ide .......................... B25J 19/026 |
| 2019/0143528 A1* | 5/2019 | Hayashi ................... B25J 19/02 |
| | | 700/245 |
| 2019/0329418 A1* | 10/2019 | Sutherland .............. F41H 13/00 |

FOREIGN PATENT DOCUMENTS

| | | |
|---|---|---|
| KR | 10-2010-0083503 | 7/2010 |
| KR | 10-2013-0029188 | 3/2013 |
| KR | 10-2013-0033920 | 4/2013 |

* cited by examiner

COMMUNICATION ROBOT

CROSS-REFERENCE TO RELATED PATENT APPLICATIONS

This application is a U.S. National Stage Application under 35 U.S.C. § 371 of PCT Application No. PCT/KR2018/003753, filed Mar. 30, 2018, which claims priority to Korean Patent Application No. 10-2017-0042084, filed Mar. 31, 2017, whose entire disclosures are hereby incorporated by reference.

TECHNICAL FIELD

The present invention relates to a communication robot that provides information to a user.

BACKGROUND ART

Internet of Things (IoT) is intelligent technology and service for interconnecting things over the Internet to perform information communication between people and things and between things.

"Sensing technology" for sensing the surrounding conditions (things or environments) to acquire information, "network technology" for connecting things to the Internet, and "service interface technology" for processing and providing information have been proposed as technologies for realizing the Internet of Things.

Information communication between things means that devices interconnected over the Internet transmit and receive information to and from each other and process the information without human intervention.

Meanwhile, means enabling things to provide information to people are necessary for information communication between people and things. To this end, visual or audible means, through which people are capable of sensing information, have been utilized. In addition, a communication robot capable of performing information communication with people has been developed.

DISCLOSURE

Technical Problem

It is well known that eye contact or gestures are important in communication between people. In communication between people and things, however, a communication robot provides visual information or audible information to a user without an action or a gesture enabling the user to actively face in an information output direction, whereby concentration is lowered or attention is not efficiently attracted. It is a first object of the present invention to solve the above problem.

In the case in which complicated motions having levels corresponding to people are realized in the communication robot in order to accomplish the first object, manufacturing cost and product price are excessively increased, whereby the possibility of putting the communication robot to practical use is lowered.

It is a second object of the present invention to realize an overall operation mechanism of the communication robot having a great ratio of effect to cost, thereby solving the above problem.

It is a third object of the present invention to diversify the operation pattern and operation direction of the communication robot using a minimum number of driving units.

It is a fourth object of the present invention to associate an image output direction of a display with the operation of the communication robot such that visual information is effectively provided to a user.

It is a fifth object of the present invention to realize a clean external appearance of the communication robot even during operation and to improve durability of a product.

It is a sixth object of the present invention to provide a structure in which the operation range of the robot is efficiently changeable.

It is a seventh object of the present invention to provide a structure in which the operation range of the robot is changeable while the image output direction of the display is maintained.

It is an eighth object of the present invention to conveniently remotely control peripheral devices of the communication robot.

The objects of the present invention are not limited to the above-mentioned object.

Technical Solution

In accordance with an aspect of the present invention, the above objects can be accomplished by the provision of a communication robot including a support body disposed at the lower side, a main body supported by the support body so as to be rotatable about a first spin rotation axis in the leftward-rightward direction, and a display body supported by the main body so as to be rotatable about a second spin rotation axis in the leftward-rightward direction. The main body is configured such that the upper part of the main body performs an inclining operation relative to the lower part of the main body. The display body is configured to output an image.

The display body may be coupled to the upper part, and the support body may be coupled to the lower part.

The second spin rotation axis may be configured to be inclined according to the inclining operation.

The main body may be configured such that the inclination direction of the upper part relative to the lower part is limited. The main body may be configured such that the inclination direction of the upper part relative to the support body is changed when the main body is rotated about the first spin rotation axis.

The communication robot may be configured to have a first state, in which the first spin rotation axis and the second spin rotation axis are disposed in parallel, and a second state, in which the second spin rotation axis is inclined relative to the first spin rotation axis according to the inclining operation.

The first spin rotation axis may extend in the upward-downward direction.

In the first state, the first spin rotation axis and the second spin rotation axis may be disposed on a single straight line.

The communication robot may include a controller configured to perform control such that the main body and the display body are rotated in opposite directions at identical angular velocities in the first state.

The main body may be configured such that the inclination direction of the upper part relative to the lower part is limited.

The communication robot may include a direction sensor configured to sense the direction of a user relative to the communication robot and a controller configured to perform control such that at least one of the main body or the display body is rotated in order to change the image output direction of the display body to the direction of the user sensed by the direction sensor.

The controller may perform control such that the main body performs the inclining operation in order to change the image output direction of the display body to the direction of the user sensed by the direction sensor.

The main body may include a spin assembly coupled to the support body so as to be rotatable about the first spin rotation axis, a bending assembly having a lower end coupled to the spin assembly, the bending assembly being configured such that the upper end of the bending assembly is inclined relative to the lower end, and a support frame coupled to the upper end. The support frame may support the display body such that the display body is rotatable about the second spin rotation axis.

The support body may include a main body support unit configured to support the main body. The main body may include a spin frame coupled to the support body so as to be rotatable about the first spin rotation axis. One of the main body support unit and the spin frame may form a plane perpendicular to the first spin rotation axis, and the other of the main body support unit and the spin frame may include a roller disposed so as to roll along the plane.

The main body may include a main case, which defines an external appearance thereof. The main case may be configured to rotate about the first spin rotation axis together with the main body and to be bent according to the inclining operation.

The communication robot may include a remote control module disposed at the display body, the remote control module being configured to transmit an optical signal for controlling a predetermined peripheral device.

In accordance with another aspect of the present invention, there is provided a communication robot including a support body disposed at the lower side, a spin assembly supported by the support body so as to be rotatable about a first spin rotation axis in the leftward-rightward direction, a bending assembly having a lower end coupled to the spin assembly, the bending assembly being configured such that the upper end of the bending assembly is inclined relative to the lower end, a support frame coupled to the upper end of the bending assembly, and a display body supported by the support frame so as to be rotatable about a second spin rotation axis in the leftward-rightward direction, the display body being configured to output an image.

Advantageous Effects

An efficient structure in which the communication robot performs motion simultaneously with output of visual information is provided, whereby it is possible to provide a feeling as if the communication robot were alive. That is, it is possible to add an emotional factor during communication between a user and the communication robot.

A structure in which various motions can be performed is provided, whereby it is possible for the user to efficiently recognize information output as an image. Furthermore, it is possible to strongly attract user's attention and to strongly enable the user to memorize information while the communication robot provides the information.

A structure in which rotation of the main body relative to the support body, inclining operation of the main body, and rotation of the display body relative to the main body are realized in an independent manner as well as in an integrated manner, whereby it is possible to diversify the operation of the communication robot using a minimum number of driving units. In addition, the image output direction and the image output position are diversified, whereby it is possible to perform dynamic motion through a minimum number of operations.

The display body and the support body are coupled to the upper part and the lower part of the main body, respectively, whereby it is possible to also rotate the display body according to rotation of the main body relative to the support body and to also incline the display body according to the inclining operation of the main body.

The second spin rotation axis is configured to be inclined according to the inclining operation, whereby it is possible to change the second spin rotation axis at various angles, and rotation of the display body relative to the main body can be performed about various rotation axes.

It is possible to realize a communication robot capable of being inclined in all directions even using a relatively simple structure in which the inclination direction of the upper part relative to the lower part is limited.

The communication robot has a first state, in which the first spin rotation axis and the second spin rotation axis are parallel to each other, whereby it is possible to rotate the main body relative to the support body and the display body while keeping the image output direction uniform.

The first spin rotation axis extends in the upward-downward direction, whereby it is possible to change the image output direction in all directions, i.e. forwards, rearwards, leftwards, and rightwards, only through rotation of the main body relative to the support body in the first state.

In the first state, the first spin rotation axis and the second spin rotation axis are disposed on a substantially single straight line, whereby it is possible to rotate the main body relative to the support body and the display body while keeping the position of the display uniform. Furthermore, the communication robot includes a controller configured to perform control such that the main body and the display body are rotated in opposite directions at the same angular velocity in the first state, whereby it is possible to drive the communication robot such that only the inclination direction of the main body relative to the support body is changed while keeping the image output direction uniform.

The image output direction is changed to a specific direction that faces the user, whereby it is possible to improve user's concentration on the communication robot. It is possible to change the image output direction so as to face the position of the user in a horizontal plane through rotation about the first spin rotation axis and/or rotation about the second spin rotation axis. In addition, it is possible to change the image output direction to the upward-downward direction so as to face the position of the user in a vertical plane through the inclining operation of the main body.

It is possible to change the optical signal emission direction of the remote control module in response to the direction of a peripheral device according to the operation of the communication robot through the remote control module disposed at the display body.

DESCRIPTION OF DRAWINGS

FIGS. 5a and 5b are perspective views showing the state in which a main body 200 of the communication robot 1 of FIG. 4 is inclined to one side, wherein FIG. 5a shows an operation B1 of the main body 200 being bent in the forward-rearward direction and FIG. 5b shows an operation B1 of the main body 200 being bent in the leftward-rightward direction.

FIGS. 12a and 12b are exploded perspective views of the communication robot 1 of FIG. 6a.

FIG. 13 is an exploded perspective view of the main body 200 of FIG. 12a.

FIGS. 21a and 21b are elevation views showing the state in which a first state of the communication robot 1 of FIG. 8 is changed to a second state, wherein FIG. 21a shows the state in which the bending assembly 240 is inclined in a negative Y-axis direction and FIG. 21b shows the state in which the bending assembly 240 is inclined in the positive Y-axis direction.

BEST MODE

Figure 1:
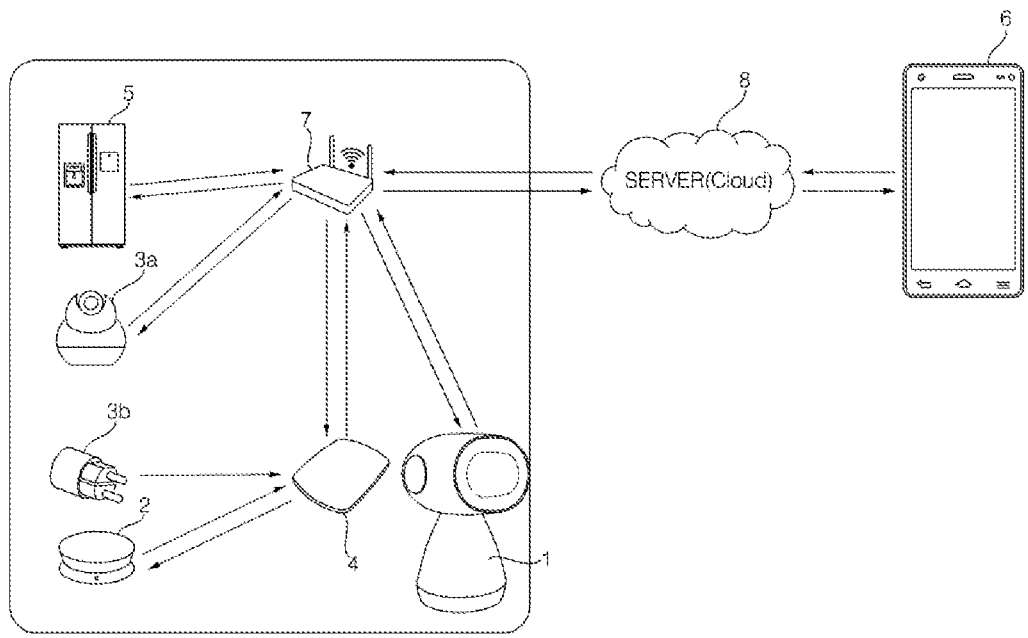
FIG. 1 is a view showing a predetermined network system according to an embodiment of the present invention.

Expressions indicating directions, such as "forwards (F), rearwards (R), leftwards (Le), rightwards (Ri), upwards (U), and downwards (D)," mentioned below, are defined as shown in FIG. 1; however, these definitions are given only for clear understanding of the present invention, and the directions may be defined differently depending on circumstances. An image output direction of a display 301 may be changed. In this specification, the image output direction of the display 301 is described as facing forwards.

Figure 6A:
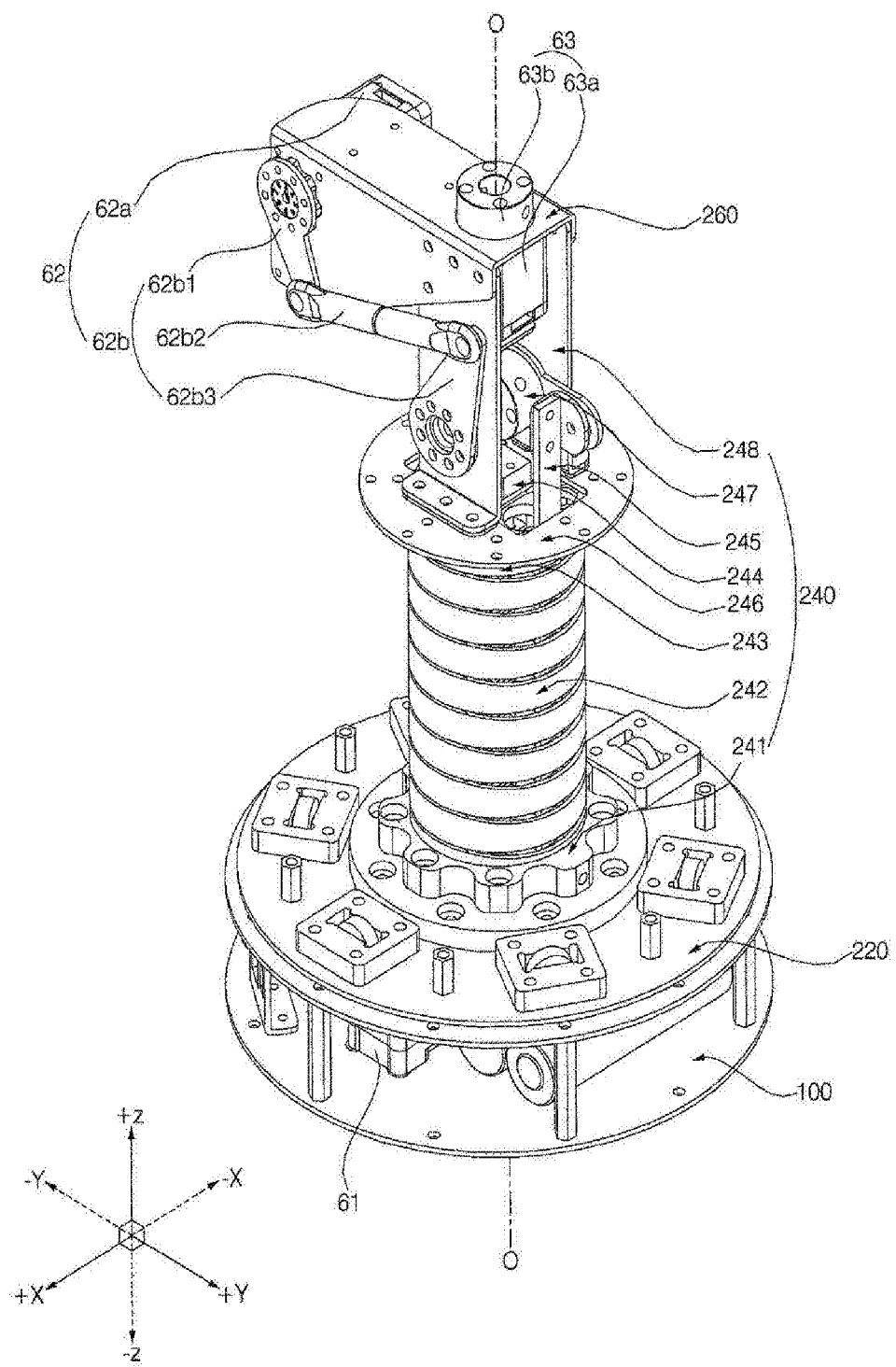
FIGS. 6a and 6b are perspective views showing the communication robot 1 of FIG. 4 with a case 19 being omitted.
Figure 6B:
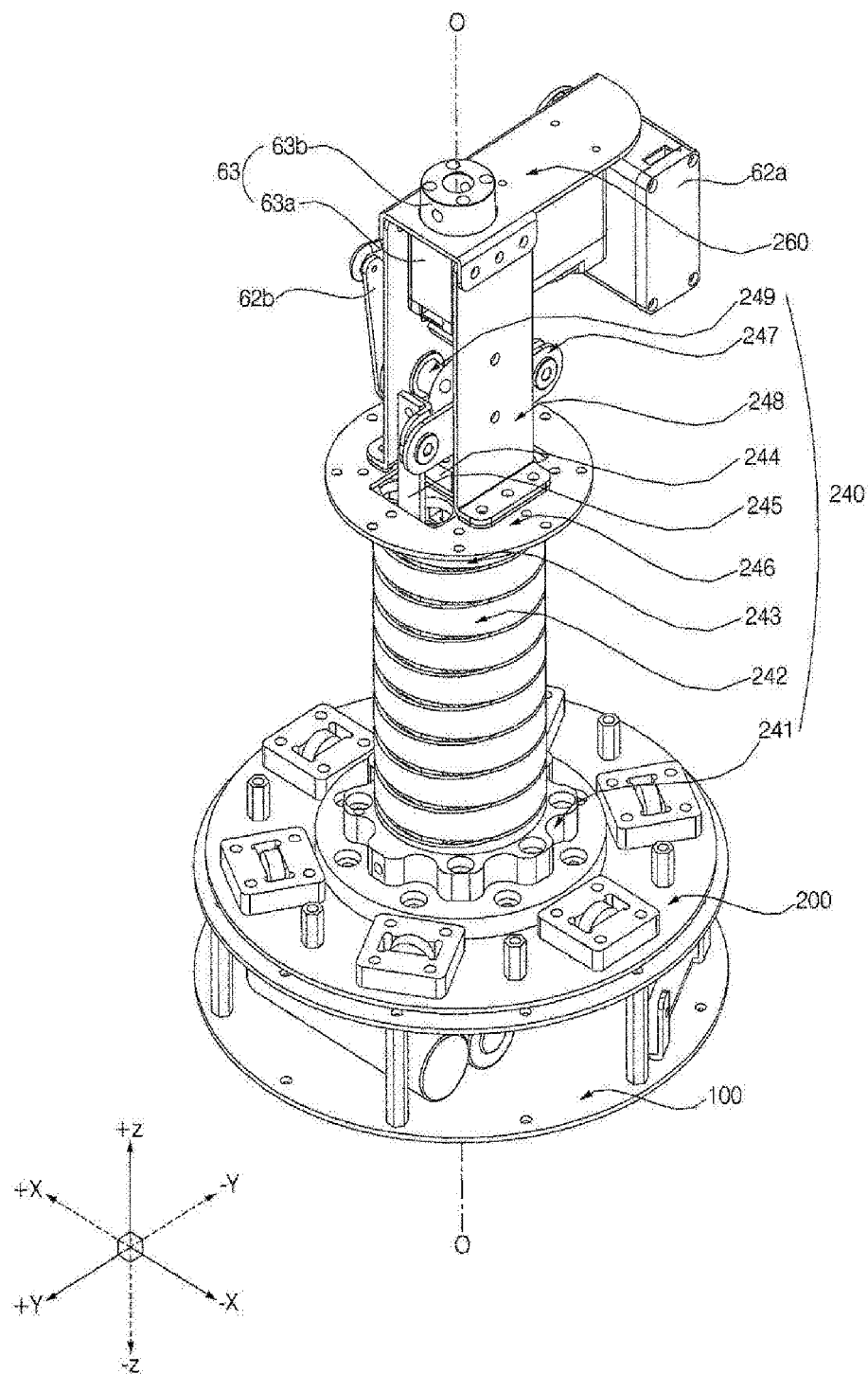
Figure 7:
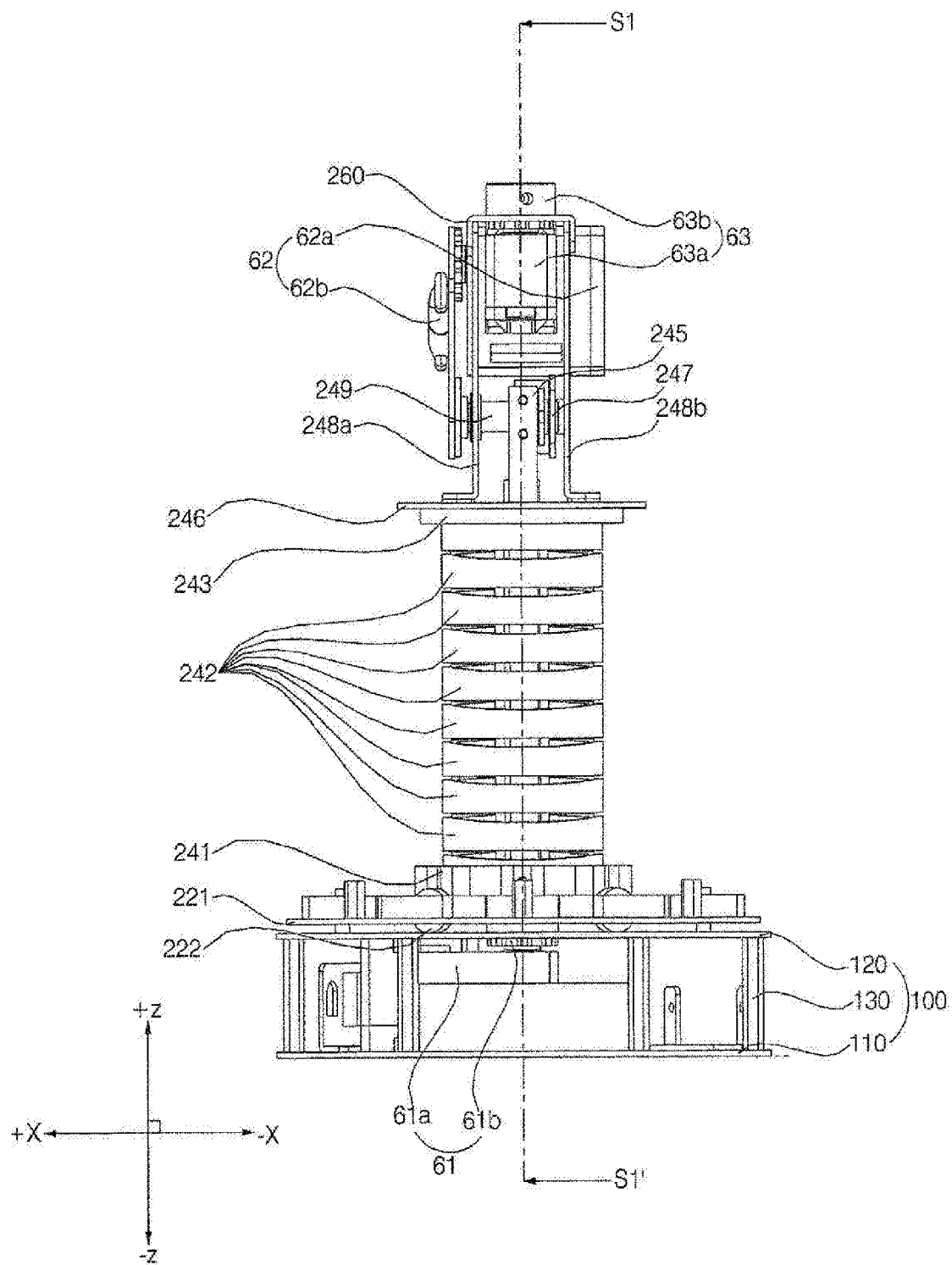
FIG. 7 is an elevation view of the communication robot 1 of FIG. 6a when viewed in a positive Y-axis direction.
Figure 8:
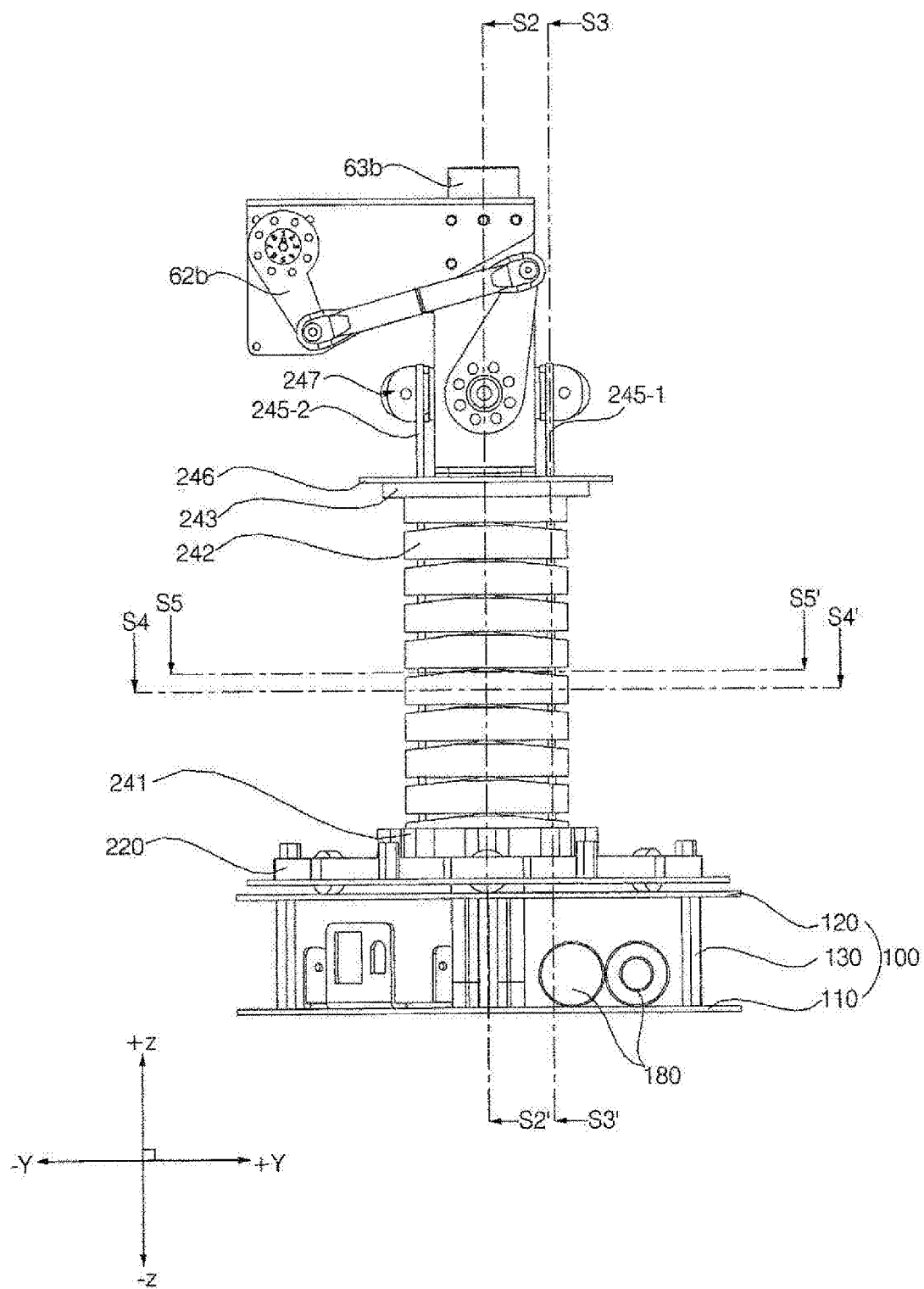
FIG. 8 is an elevation view of the communication robot 1 of FIG. 6a when viewed in a positive X-axis direction.
Figure 9:
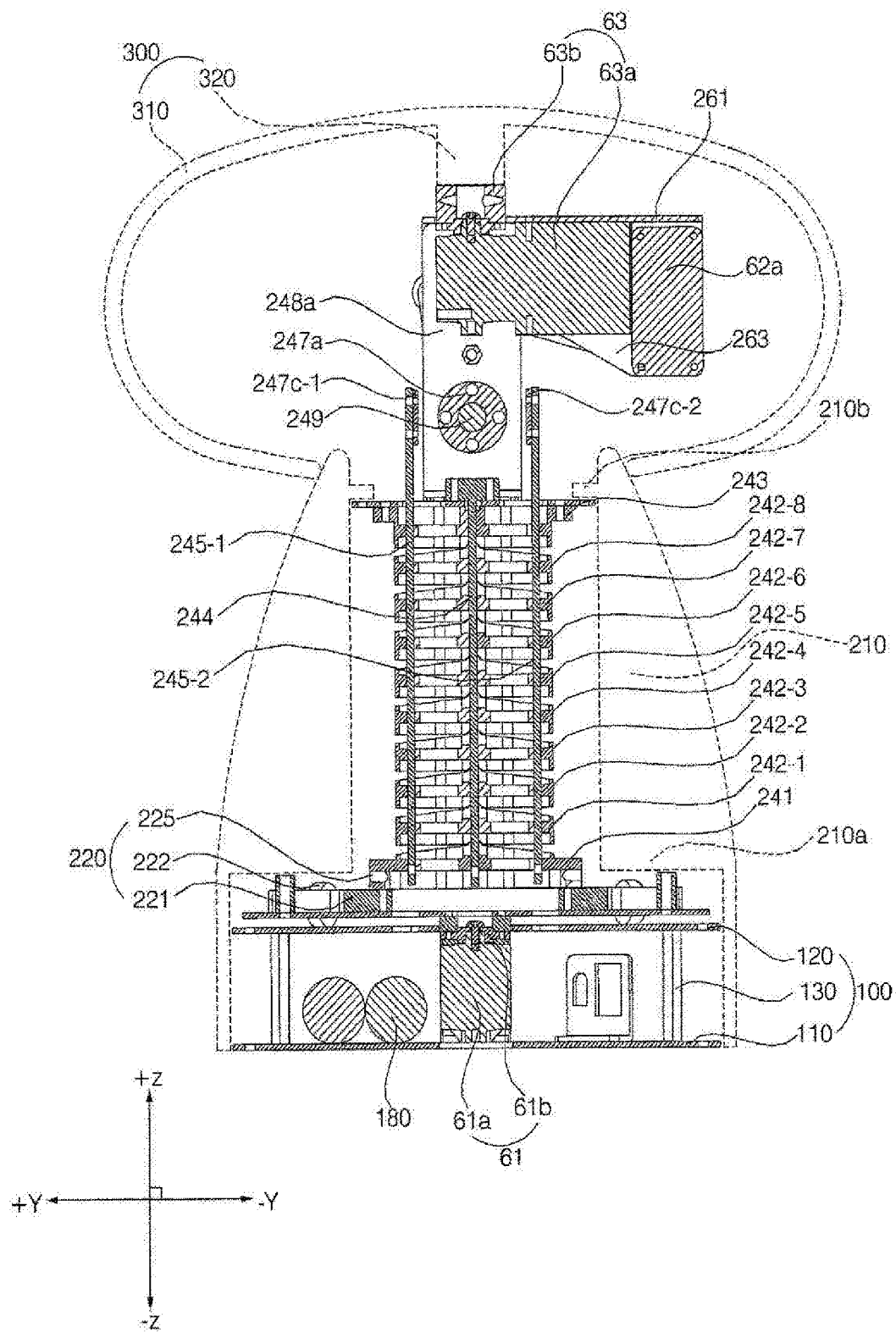
FIG. 9 is a vertical sectional view of the communication robot 1 taken along line S1-S1' of FIG. 7.

The present invention may be described based on a space rectangular coordinate system defined by an X axis, a Y axis, and a Z axis, which are perpendicular to each other, shown in FIG. 6a, etc. In this specification, the upward-downward direction is defined as the Z-axis direction and the direction in which a main body 200 is inclined is defined as the Y-axis direction in order to define the X axis, the Y axis, and the Z axis. Disposition of the X axis and the Y axis relative to the support body 100 is changed according to rotation of the main body 200 relative to a support body 100. Each axial direction (i.e. the X-axis direction, the Y-axis direction, and the Z-axis direction) means a two-way direction in which each axis extends. Each positive axis direction (i.e. the positive X-axis direction, the positive Y-axis direction, and the positive Z-axis direction) is one-side direction of the two-way direction in which each axis extends, and is denoted by the symbol "+". Each negative axis direction (i.e. the negative X-axis direction, the negative Y-axis direction, and the negative Z-axis direction) is the other-side direction of the two-way direction in which each axis extends, and is denoted by the symbol "−".

In this specification, the terms "first," "second," "third," etc. are used only to avoid confusion between designated components, and do not indicate the sequence or importance of the components or the relationships between the components. For example, it is possible to realize a device including a second component alone without a first component.

Referring to FIG. 6a, etc., in this specification, a "central axis O" means an imaginary line passing through the center of a device in the upward-downward direction (the Z-axis direction). Also, in this specification, a "circumferential direction" means a direction of a circumference about the central axis O, a "centrifugal direction" means a direction that becomes far away from the central axis O, and a "counter-centrifugal direction" means a direction that becomes close to the central axis O. Here, the "circumferential direction," the "centrifugal direction," and the "counter-centrifugal direction" are described on the basis of the state in which a bending assembly 240 stands upright without being inclined.

Referring to FIGS. 4, 5a, 5b, and 10, in this specification, a "first spin rotation axis Os1" means a rotation axis when the main body 200 performs rotation A relative to the support body 100, and a "second spin rotation axis Os2" means a rotation axis when a display body 300 performs rotation C relative to the main body 200.

Figure 10:
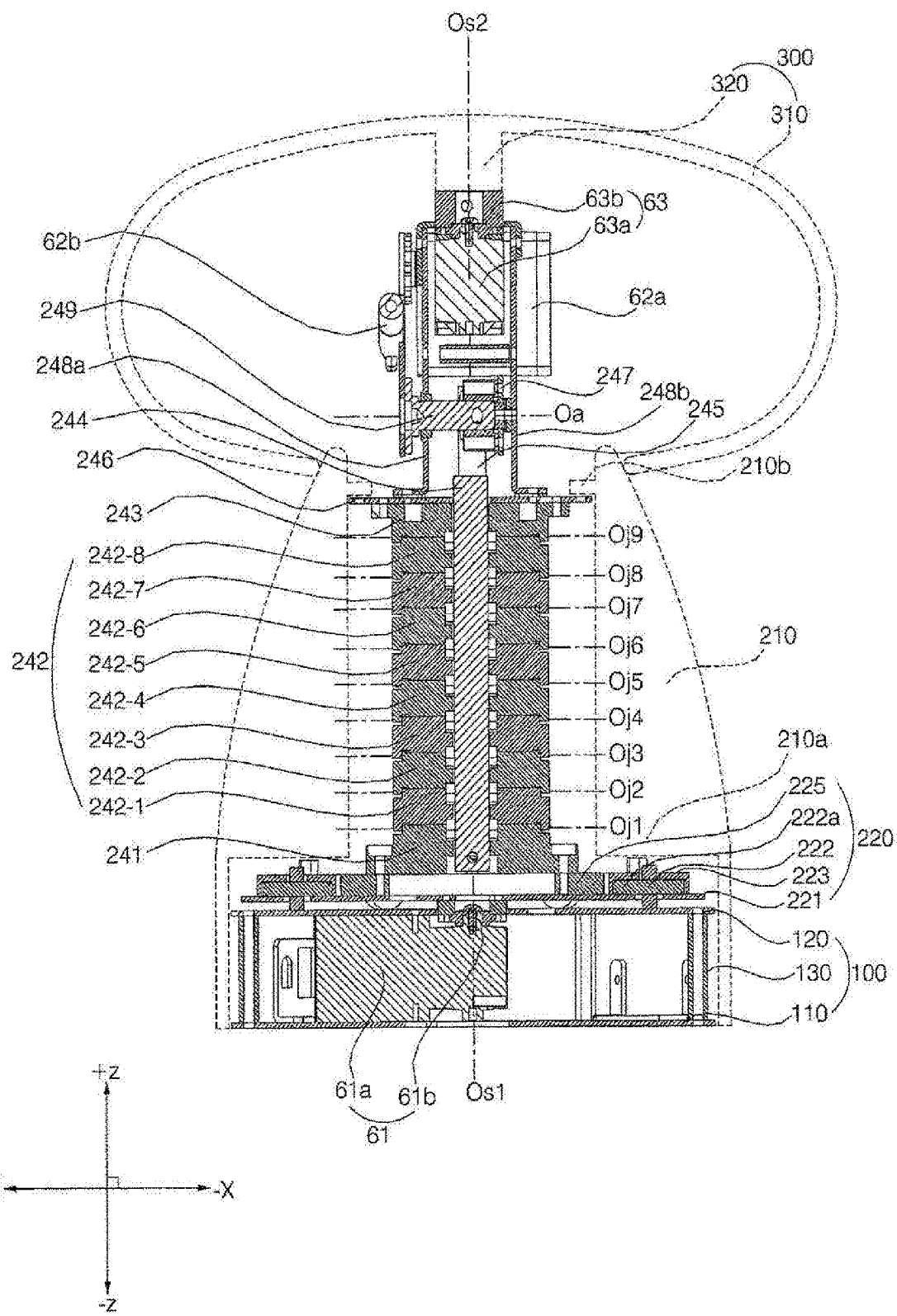
FIG. 10 is a vertical sectional view of the communication robot 1 taken along line S2-S2' of FIG. 8.
Figure 11:
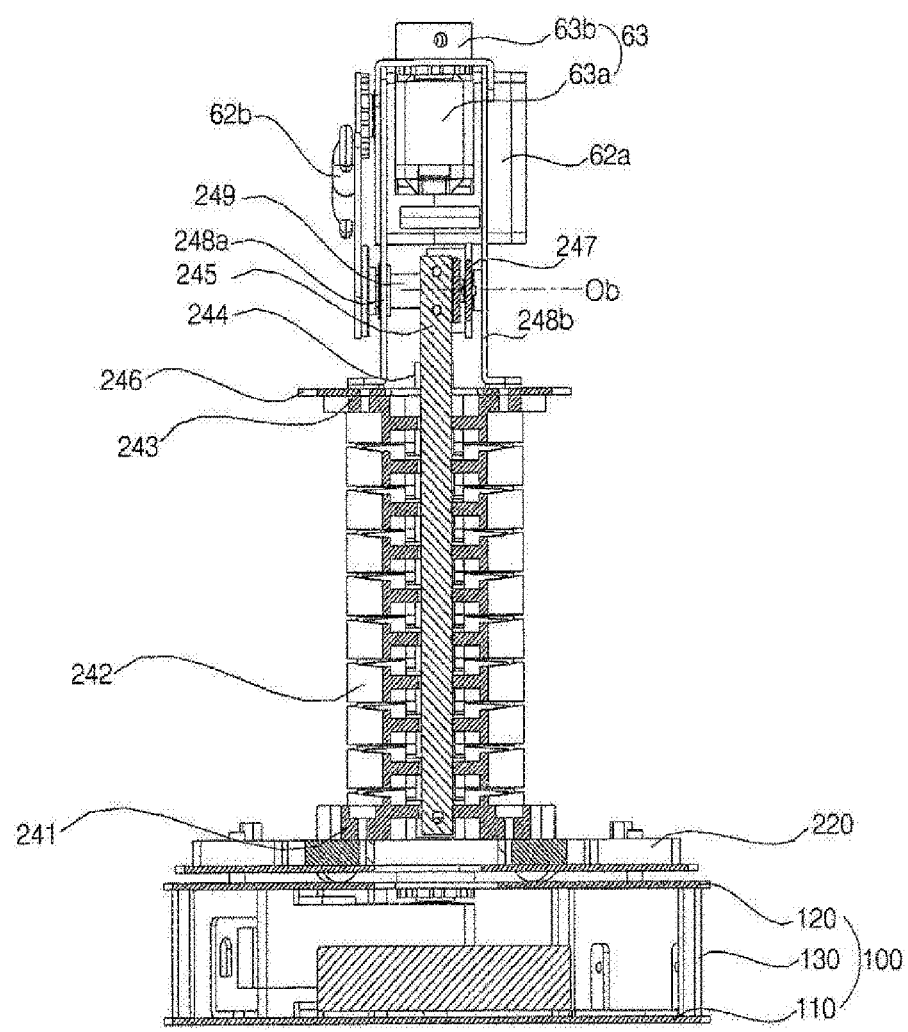
FIG. 11 is a vertical sectional view of the communication robot 1 taken along line S3-S3' of FIG. 8.
Figure 11:
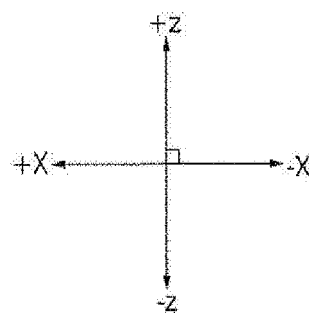
Figure 12A:
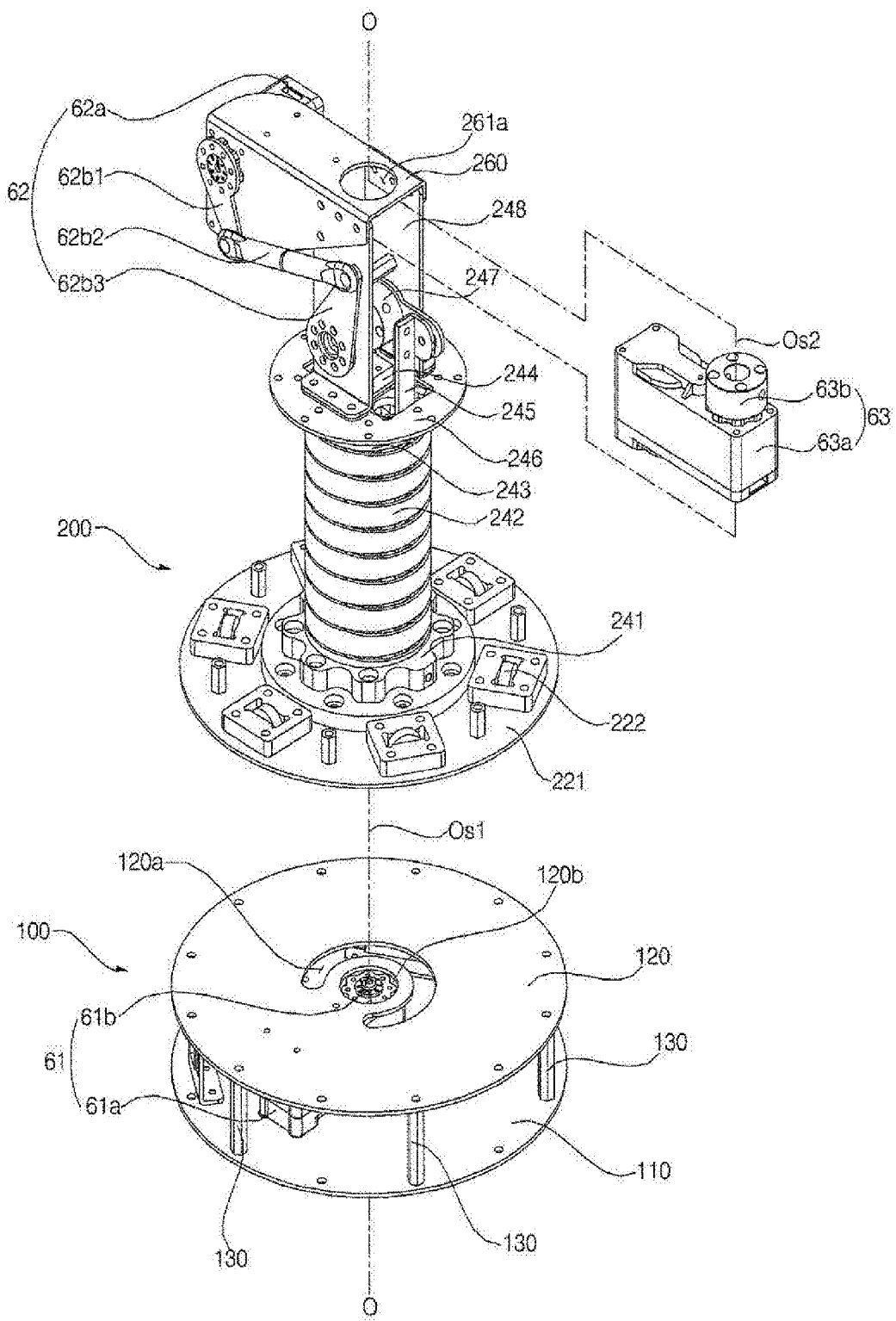
Figure 12B:
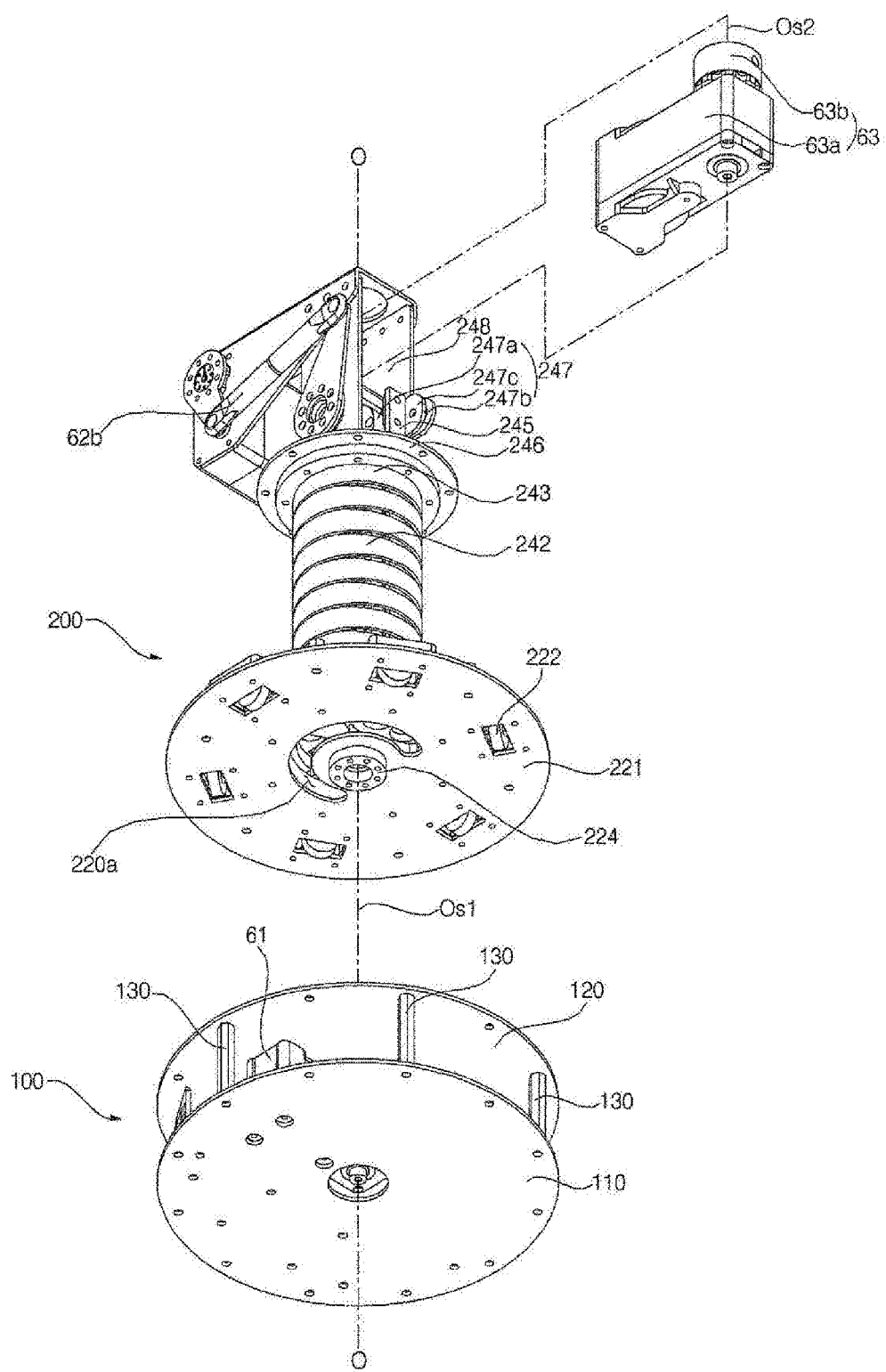
Figure 21A:
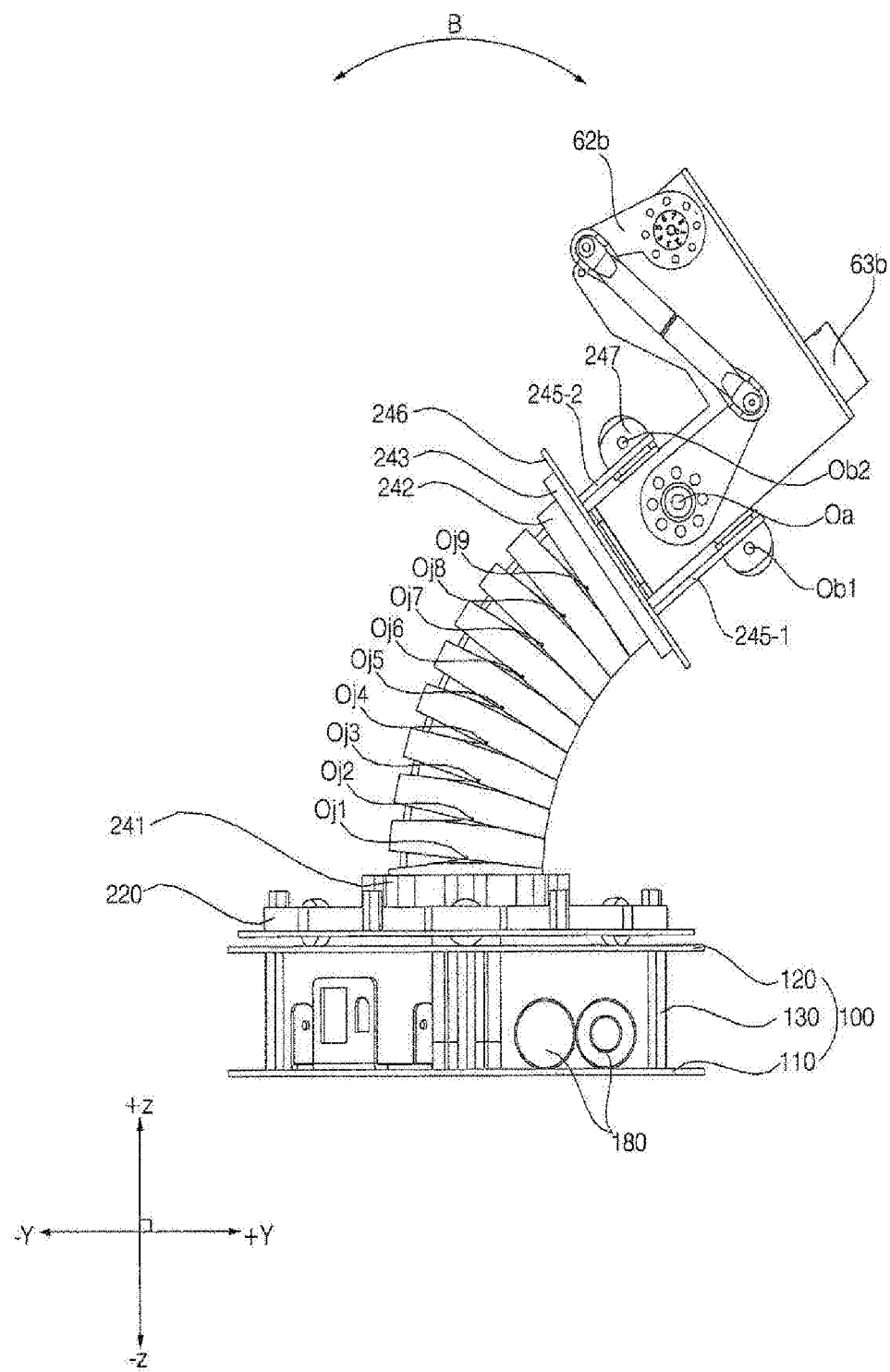
Figure 21B:
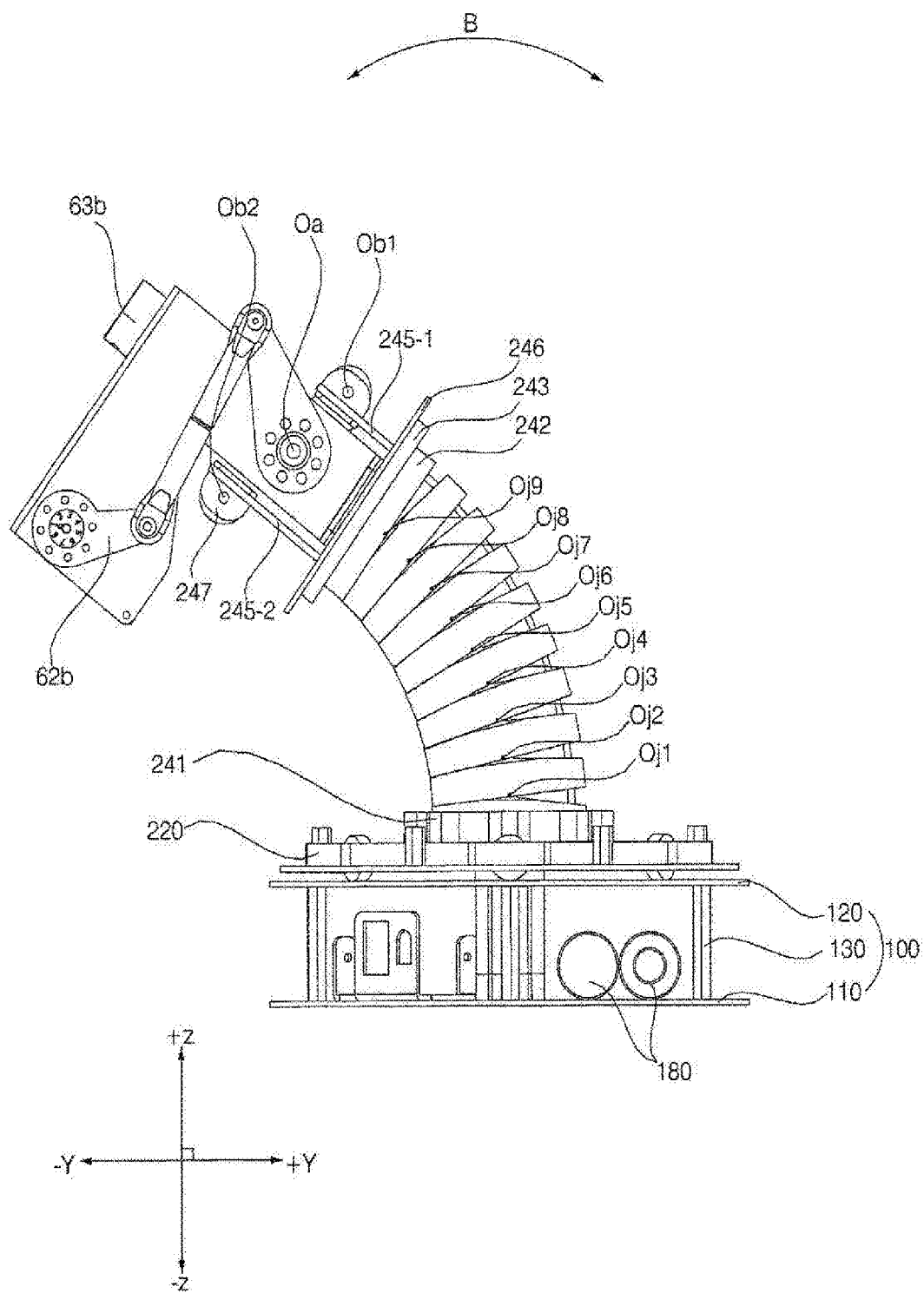

Referring to FIGS. 10, 21a, and 21b, in this specification, an "articulation rotation axis Oj" means a rotation axis when a rotary body of the main body 200 performs rotation B relative to another rotary body. In the case in which the main body 200 includes n rotary bodies, n−1 articulation rotation axes Oj, . . . , and Ojn−1 may be provided (n being a natural number equal to or greater than 2). In this embodiment, the main body 200 includes ten rotary bodies 241, 242-1, 242-2, 242-3, 242-4, 242-5, 242-6, 242-7, 242-8, and 243, and nine articulation rotation axes Oj1, Oj2, Oj3, Oj4, Oj5, Oj6, Oj7, Oj8, and Oj9 are provided.

Hereinafter, a home network will be described by way of example as a predetermined network; however, the present invention is not limited thereto. FIG. 1 is a view showing a home network system according to an embodiment of the present invention. Referring to FIG. 1, the home network system according to the embodiment of the present invention may include accessories 2, 3a, and 3b, a gateway 4, an access point 7, and a communication robot (communication robot) 1, which transmit information to each other through a wired or wireless network. In addition, the home network system may further include a server 8 and a terminal 6.

The network may be constructed based on Wi-Fi, Ethernet, ZigBee, Z-wave, or Bluetooth. Each of the accessories 2, 3a, and 3b, the gateway 4, the access point 7, and the communication robot 1 may include a communication module capable of accessing the network according to a predetermined protocol.

The communication module included in each of the devices 2, 3a, 3b, 4, 7, and 1 constituting the network system is set based on the construction of the network. Each device may include a plurality of communication modules based on a communication scheme between each device and the network or between devices.

Each of the accessories 2, 3a, and 3b includes at least one communication module for accessing the network. The communication module communicates with the predetermined network.

Each of the accessories 2, 3a, and 3b may include a sensor module for sensing a predetermined surrounding situation. Each of the accessories 2, 3a, and 3b may include a control module that performs a specific function influencing a surrounding environment. Each of the accessories 2, 3a, and 3b may include a remote control module for transmitting an optical signal (e.g. an infrared signal) for controlling a predetermined peripheral device.

Each of the accessories 2, 3a, and 3b including the sensor module may be a device including an atmospheric pressure sensor, a humidity sensor, a temperature sensor, a radioactivity sensor, a heat sensor, a gas sensor, an air quality sensor, an electronic nose sensor, a healthcare sensor, a biometric sensor, a sleep sensor (e.g. a sensor for sensing snoring, sleep apnea, and toss and turn of a user while the user sleeps in the state in which the sensor is attached to the pajamas or underwear of the user), a proximity sensor, an ambient light sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, or an optical sensor (e.g. a video sensor or an image sensor).

Each of the accessories 2, 3a, and 3b including the control module may be a device including a smart light for controlling lighting, a smart plug for controlling the application and intensity of electric power, a smart temperature controller for controlling whether or not to operate a boiler or an air conditioner and the operation level of the boiler or the air conditioner, or a smart gas lock for controlling whether or not to interrupt gas.

Each of the accessories 2, 3a, and 3b including the remote control module may be a device including an infrared LED that transmits an infrared (IR) signal to a remotely controllable electric home appliance.

Each of the accessories 3a and 3b may be installed only for a predetermined purpose in order to exhibit predetermined performance. For example, the accessory 3a is a video camera, and the accessory 3b is a smart plug.

The accessory 2 according to the embodiment of the present invention may be configured to be installed at a position desired by a user. In addition, the accessory may be configured to be utilized for various purposes. For example, the accessory 2 may be attached to an external object, such as an electric home appliance, a door, a window, or a wall.

One or more accessories 2 and 3b communicate with the access point 7 through the gateway 4. The gateway 4 wirelessly communicates with the accessory 2. The gateway 4 communicates with the access point 7 in a wired or wireless fashion. For example, communication between the gateway 4 and the access point 7 may be performed based on Ethernet or Wi-Fi.

The access point 7 may be connected to the server 8 through wired or wireless communication. Access to the server 8 is possible through the Internet. Various terminals 6 connected to the Internet may communicate with the server 8. Examples of the terminal 6 may include a personal computer (PC) and a mobile terminal, such as a smartphone.

The gateway 4 enables one or more accessories 2 and 3b to communicate with the access point 7. The gateway 4 communicates with the accessory 2 in a wireless fashion. The gateway 4 communicates with the access point 7 in a wired or wireless fashion. For example, the communication between the gateway 4 and the access point 7 may be based on Ethernet or Wi-Fi.

The access point 7 may be connected to the server 8 through wired or wireless communication. The server 8 may be accessible over the Internet. Various terminals 6 connected to the Internet may communicate with the server 8. For example, the terminal 6 may be a personal computer (PC) or a mobile terminal such as a smartphone.

The accessories 2 and 3b may be configured to communicate with the gateway 4. In another example, the accessory 3a may be configured to communicate with the access point 7 directly, rather than via the gateway 4.

The access point 7 may be configured to communicate with the accessory 3a or with another device 5 including a communication module directly, rather than via the gateway 4. The devices 5 and 3a may each include a Wi-Fi communication module, through which the devices 5 and 3a can communicate with the access point 7 directly, rather than via the gateway 4.

The communication robot 1 may be connected to the access point 7 through wired communication (e.g. Ethernet) or wireless communication (e.g. Wi-Fi). Communication between the communication robot 1 and the accessories 2 and 3b may be performed via the gateway 4 and the access point 7. In another example, communication between the communication robot 1 and the accessory 3a or the other device 5 may be performed via the access point 7.

Specifically, signals from the accessories 2 and 3b may be transmitted to the communication robot 1 via the gateway 4 and the access point 7 in turn, and a signal from the communication robot 1 may be transmitted to the accessories 2 and 3b via the access point 7 and the gateway 4 in turn. In another example, a signal from the accessory 3a or the other device 5 may be transmitted to the communication robot 1 via the access point 7, and a signal from the communication robot 1 may be transmitted to the accessory 3a or the other device 5 via the access point 7.

For example, information acquired by the sensor module of each of the accessories 2, 3a, and 3b may be transmitted to the server 8, the terminal 6, or the communication robot 1 over the network. In addition, a signal for controlling the sensor module, the control module, or the remote control module may be transmitted from the server 8, the communication robot 1, or the terminal 6 to the accessory 2. The signals are transmitted via the gateway 4 and/or the access point 7.

Communication between the accessories 2, 3a, and 3b and the communication robot 1 may be performed based only on the gateway 4 and the access point 7. For example, even in the case in which the home network is not connected to an external communication network such as the Internet, communication between the accessories 2, 3a, and 3b and the communication robot 1 may still be performed.

In the case in which the communication robot 1 is connected to the server 8 via the access point 7, information transmitted from the communication robot 1 or the accessory 2 may be stored in the server 8. The information stored in the server 8 may be received by the terminal 6 connected to the server 8.

In addition, information transmitted from the terminal 6 may be transmitted to the communication robot 1 or the accessory 2 via the server 8. A smartphone, which is a terminal that has been widely used in recent years, provides a convenient graphical user interface (UI). Consequently, the communication robot 1 and/or the accessory 2 may be controlled, or information received from the communication robot 1 and/or the accessory 2 may be processed and displayed, through the UI. In addition, an application installed in the smartphone may be updated so as to extend the range of functions that can be performed by the communication robot 1 and/or the accessory 2.

Meanwhile, although not shown, the terminal 6 and the communication robot 1 may communicate with each other directly without the involvement of the server 8. For example, the communication robot 1 and the terminal 6 may communicate with each other directly via Bluetooth.

Meanwhile, the accessory 2 may be controlled or information received from the accessory 2 may be processed and displayed using only the communication robot 1 without using the terminal 6.

The communication robot 1 includes an input unit 50 for receiving a command for controlling the communication robot 1. The input unit 50 may receive a command for controlling the accessory 2. The input unit 50 may include a switch 51 or a touchscreen. The input unit 50 may include a microphone 53. In the case in which the communication robot 1 includes a microphone, a controller 20 of the communication robot 1 may recognize user voice input through the microphone 53 and extract a command therefrom.

Figure 2:
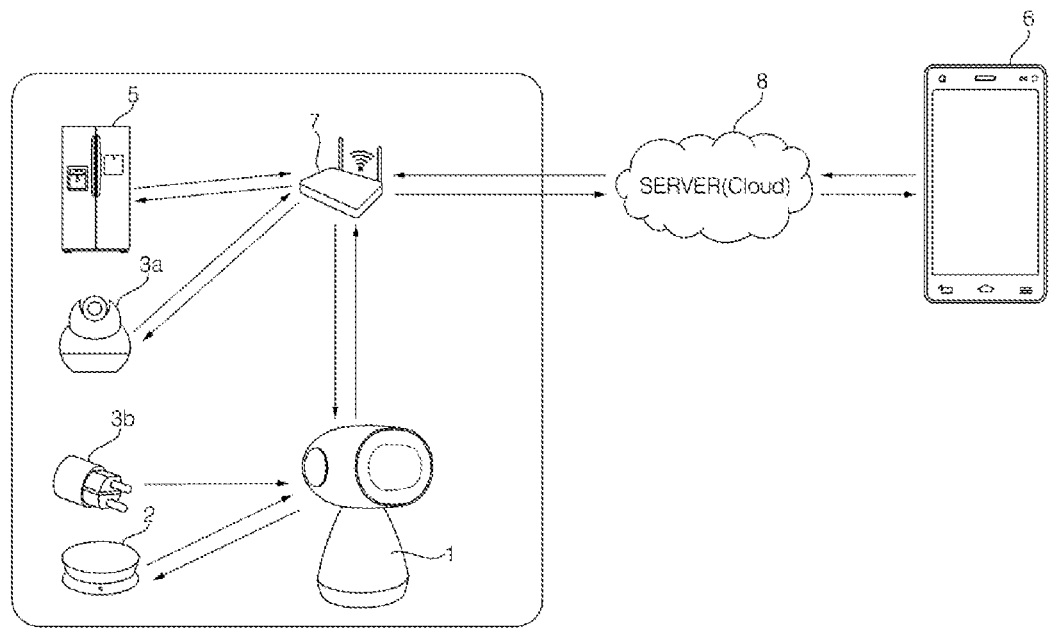
FIG. 2 is a view showing a predetermined network system according to another embodiment of the present invention.

FIG. 2 is a view showing a home network system according to another embodiment of the present invention.

The home network system according to the other embodiment of the present invention is substantially identical to the home network system according to the previous embodiment except that the gateway 4 is not provided and that the communication robot 1 also performs the functions that the gateway 4 performs.

Figure 3:
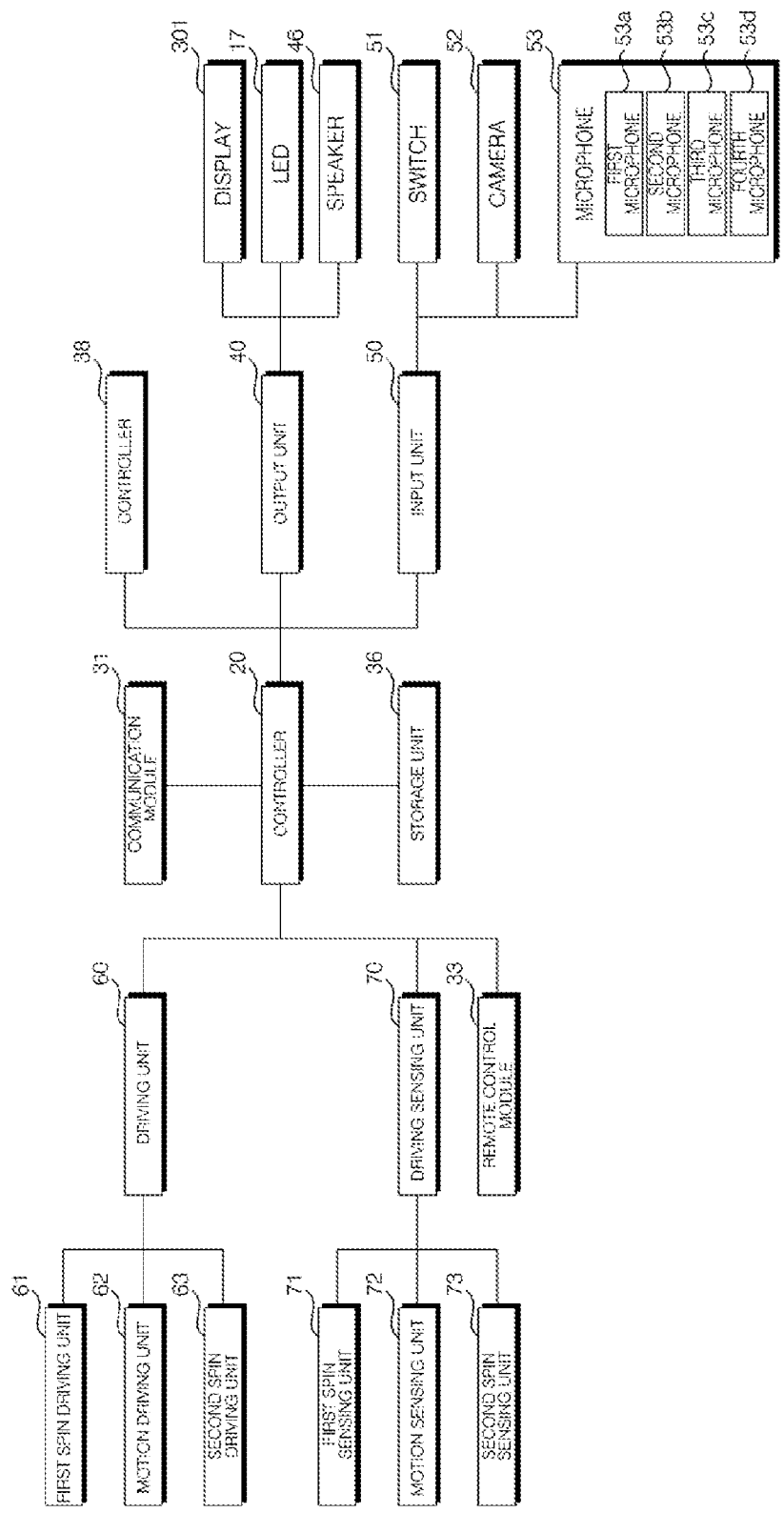
FIG. 3 is a block diagram showing functions of a communication robot 1 according to an embodiment of the present invention.

Hereinafter, the functional construction of the communication robot 1 will be described with reference to FIG. 3. The communication robot 1 may include a controller 20 for controlling at least one function of the communication robot 1. Of course, the controller 20 may be provided in the server 8 or the terminal 6. Even in this case, the present invention may be embodied over a network.

The communication robot 1 may include a communication module 31 for communicating with a predetermined network. The communication module 31 may include a Wi-Fi module, a Bluetooth module, a ZigBee module, or a Z-wave module. The communication module 31 may be changed depending on the communication scheme of a device with which the communication module 31 will communicate directly.

The communication module 31 communicates with a predetermined network. That the communication module 31 communicates with a predetermined network means that the communication module 31 communicates with at least one of the access point 7, the gateway 4, the accessory 2, 3*a*, or 3*b*, the server 8, or the terminal 6 constituting the network.

Information acquired from the input unit 50 may be transmitted over the network through the communication module 31. The communication robot 1 may receive information over the network through the communication module 31, and an output unit 40, a driving unit 60, or a remote control module may be controlled based on the received information.

The communication robot 1 may include a storage unit 36 for storing information acquired through a driving sensing unit 70. The storage unit 36 may store information received through the communication module 31 over the network N. The storage unit 36 may store a command from the input unit 50.

The communication robot 1 may include a power supply device 38 for supplying power to respective components of the communication robot 1. The power supply device 38 may include a battery 180. The battery 180 may be provided for the purpose of charging. The power supply device 38 may include a power connection portion (not shown) for connection with an external power cable. The power supply device 38 may include a wireless charging module (not shown) for charging the battery 180.

The communication robot 1 includes an output unit 40 for providing information to a user. The output unit 40 includes a display 301 for visually outputting information. The output unit 40 may include an LED 17 for emitting light outside. The output unit 40 may include a speaker 46 for audibly outputting information.

The communication robot 1 may include an input unit 50 for allowing the user to input a command directly, rather than via the communication module 31.

The input unit 50 may include a switch 51. The switch may include a power switch for turning the communication robot 1 ON/OFF. The switch 51 may include a function switch for setting functions of the communication robot 1, pairing of the communication robot with a predetermined network, or pairing of the communication robot with the terminal 6. The communication robot 1 may be preset such that various commands are input to the communication robot 1 through a combination of time during which the function switch is pushed and/or the number of times the function switch is pushed in succession. The switch 51 may include a reset switch for resetting the preset functions of the communication robot 1. The switch 51 may include a sleep switch for switching the communication robot 1 to a power-saving state or to a non-output state.

The input unit 50 includes a camera 52 for sensing an external visual image. The camera 52 may acquire an image for recognizing the user. The camera 52 may acquire an image for recognizing the direction of the user. Image information acquired by the camera 52 may be stored in the storage unit 36.

The input unit 50 includes a microphone 53 for sensing external sound. In order to recognize the position of a sound source, the input unit 50 may include a plurality of microphones 53. The sound source may be the position of the face of the user. The input unit 50 may include three microphones 53*a*, 53*b*, and 53*c* for recognizing the position of the sound source in a plane. The input unit 50 may include four microphones 53*a*, 53*b*, 53*c*, and 53*d* for recognizing the position of the sound source in a space. Information about the sound or the position of the user acquired by the microphone 53 may be stored in the storage unit 36.

The communication robot 1 may include a direction sensor (not shown) for sensing the direction of the user relative to the communication robot 1. The direction sensor may include a camera 52 and/or a plurality of microphones 53.

The communication robot 1 may include a remote control module 33 for transmitting an optical signal (e.g. an infrared signal) for controlling a predetermined peripheral device. The "predetermined peripheral device" means a remotely controllable peripheral device. For example, the predetermined peripheral device may be a washing machine, a refrigerator, an air conditioner, a robot cleaner, or a TV, which can be controlled using a remote controller. The remote control module 33 may include a light-emitting unit (not shown) for emitting an optical signal for controlling the predetermined peripheral device. For example, the light-emitting unit may be an LED for emitting infrared light. The direction in which the remote control module 33 emits the optical signal may be changed depending on the operation of the communication robot 1. Consequently, the direction in which the remote control module 33 emits the optical signal is changed to the direction of a specific device that is necessary to be remotely controlled such that the specific device can be controlled using the optical signal.

The communication robot 1 includes a driving unit 60 for performing motion. The communication robot 1 performs motion simultaneously with output from the display 301 and the speaker 46 of the communication robot 1, thereby providing a feeling as if the communication robot were alive. As eye contact or gestures (motions) are important in communication between people, the motion of the communication robot 1 by the driving unit 60 may enable the user to efficiently recognize information output from the output unit 40. The motion of the communication robot 1 by the driving unit 60 is provided to add an emotional factor during communication between the user and the communication robot 1.

The driving unit 60 may include a plurality of driving units 61, 62, and 63. The driving units 61, 62, and 63 may be independently driven, or may be simultaneously driven in order to perform composite motion.

The driving unit 60 includes a first spin driving unit 61 for providing power necessary for the main body 200 to rotate about a first spin rotation axis Os1 relative to a support body 100.

The driving unit 60 includes a motion driving unit 62 for providing power necessary for the main body 200 to perform a bending operation (also referred to as an "inclining operation"). The motion driving unit 62 may provide power necessary for at least one of rotary bodies 241, 242, and 243 to rotate about an articulation rotation axis Oj. The motion driving unit 62 may be rotated about the first spin rotation axis Os1 by the first spin driving unit 61.

The driving unit 60 includes a second spin driving unit 63 for providing power necessary for a display body 300 to rotate about a second spin rotation axis Os2 relative to the main body 200. The second spin driving unit 63 may be rotated about the first spin rotation axis Os1 by the first spin driving unit 61. The second spin driving unit 63 may be inclined by the motion driving unit 62. The second spin rotation axis Os2 may be inclined by the motion driving unit 62.

The communication robot 1 includes a driving sensing unit 70 for sensing the current motion state thereof by the driving unit 60. The driving sensing unit 70 may include a first spin sensing unit 71 for sensing the angle by which the main body 200 rotates about the first spin rotation axis Os1 relative to the support body 100. The driving sensing unit 70 includes a motion sensing unit 72 for sensing the extent to which one end of the main body 200 is inclined to the other end thereof. The driving sensing unit 70 includes a second spin sensing unit 73 for sensing the angle by which the display body 300 rotates about the second spin rotation axis Os2 relative to the main body 200.

The controller 20 controls the communication module 31. The controller 20 may control the communication module 31 based on control information received from the input unit 50. The controller 20 may perform control such that information received by the communication module 31 from the network is stored in the storage unit 36. The controller 20 may perform control such that information stored in the storage unit 36 is transmitted to the network through the communication module 31.

The controller 20 may receive control information from the input unit 50. The controller 20 may perform control such that the output unit 40 outputs predetermined information. The controller 20 may perform control such that the driving unit 60 is operated together with output of information by the output unit 40.

In an example, the controller 20 may recognize a user based on an image acquired from the camera 52, and may operate the output unit 40 and the driving unit 60 based thereon. In the case in which the recognized user coincides with a predetermined user, the controller 20 may perform control such that the display 301 displays a smiling image and the motion driving unit 62 is operated to incline the main body 200 in the forward-rearward direction (or in the leftward-rightward direction).

In another example, the controller may perform control such that the main body 200 rotates relative to the support body 100 in the state in which the image output direction is maintained. Specifically, in the case in which the main body 200 is rotated about the first spin rotation axis Os1 relative to the support body 100 in one direction (e.g. the clockwise direction) and the display body 300 is rotated relative to main body 200 in a direction (e.g. the counterclockwise direction) opposite the one direction, the direction in which the main body 200 is inclined by the bending operation may be changed while the image output direction of the display 301 is maintained to one side. As a result, it is possible to incline the display body 300 in all directions using the main body 200, which has a structure in which the bending direction of one end to the other end thereof is limited.

In a further example, the controller 20 may recognize the position of the face of the user based on the direction sensor, and may operate the output unit 40 and the driving unit 60 based thereon. In the case in which the recognized user coincides with a predetermined user, the controller 20 may perform control such that the display 301 displays predetermined information and the first spin driving unit 61 and/or the second spin driving unit 63 are operated to direct the display 301 to the face of the user.

The controller 20 may perform control such that at least one of the main body 200 or the display body 300 is rotated in order to change the image output direction of the display body 300 to the direction of the user sensed by the direction sensor. Consequently, it is possible to change the image output direction to the leftward-rightward direction.

The controller 20 may perform control such that the main body 200 is inclined in order to change the image output direction of the display body 300 to the direction of the user sensed by the direction sensor. Consequently, it is possible to change the image output direction to the upward-downward direction. For example, it is possible to recognize the position of the face of the user in a space coordinate system through four microphones 53a, 53b, 53c, and 53d, and the controller 20 may control the driving unit 60 such that the image output direction of the display body 300 is changed to the leftward-rightward direction and the forward-rearward direction in order to change the image output direction of the display body 300 to the direction of the position of the face of the user in the space.

The controller 20 may control whether or not to operate the driving unit 60 based on control information received from the network through the communication module 31. The controller 20 may control the driving unit 60 based on control information received from the input unit 50. The controller 20 may control the driving unit 60 based on control information stored in the storage unit 36.

Hereinafter, the overall structure of the communication robot 1 will be described with reference to FIGS. 4 to 11.

The communication robot 1 includes a support body 100 disposed at the lower side thereof. The support body 100 rotatably supports the main body 200. The support body 100 may be placed on an external floor.

The communication robot 1 includes a main body 200 supported by the support body 100 so as to be rotatable about the first spin rotation axis Os1. The first spin rotation axis Os1 may extend in the upward-downward direction. The first spin rotation axis Os1 may extend in the Z-axis direction. The first spin rotation axis Os1 may be disposed on a central axis O. The main body 200 is rotatable in the leftward-rightward direction (see arrow A). The main body 200 may be configured such that the angle thereof rotatable relative to the support body 100 is limited.

The main body 200 is configured such that the upper part thereof can be inclined relative to the lower part thereof. The main body 200 is configured such that one end thereof can be inclined relative to the other end thereof. The main body 200 may be configured to perform a bending operation (see arrows B, B1, and B2). The main body 200 may rotatably support the display body 300.

The communication robot 1 includes a display body 300 supported by the main body 200 and configured to output an image. The display body 300 is supported by the main body 200 so as to be rotatable about the second spin rotation axis Os2. When the main body 200 performs a bending operation, the extension direction of the second spin rotation axis Os2 is changed (see arrow C). The display body 300 may be configured such that the angle thereof rotatable relative to the main body 200 is limited.

The display body 300 may be rotated about the first spin rotation axis Os1 together with the main body 200. In addition, the display body 300 may be rotated about the second spin rotation axis Os2 relative to the main body 200. Consequently, the direction in which the display body 300 faces may be changed, and the image output direction of the display body 300 may be changed so as to face the position of the user in a horizontal plane.

The main body 200 may be configured such that the upper part thereof can be inclined relative to the lower part thereof. The display body 300 is coupled to the upper part of the main body 200. The support body 100 is coupled to the lower part of the main body 200. Consequently, the display body 300 may also be rotated by the rotation of the main body 200 relative to the support body 100, and the display body 300 may also be inclined according to the inclining operation of the main body 200.

In addition, the display body 300 is configured so as to be inclined to one side according to the inclining operation of the main body 200. Consequently, the direction in which the display body 300 faces may be changed, and the image output direction of the display body 300 may be changed to the upward-downward direction so as to face the position of the user in a vertical plane.

Figure 5A:
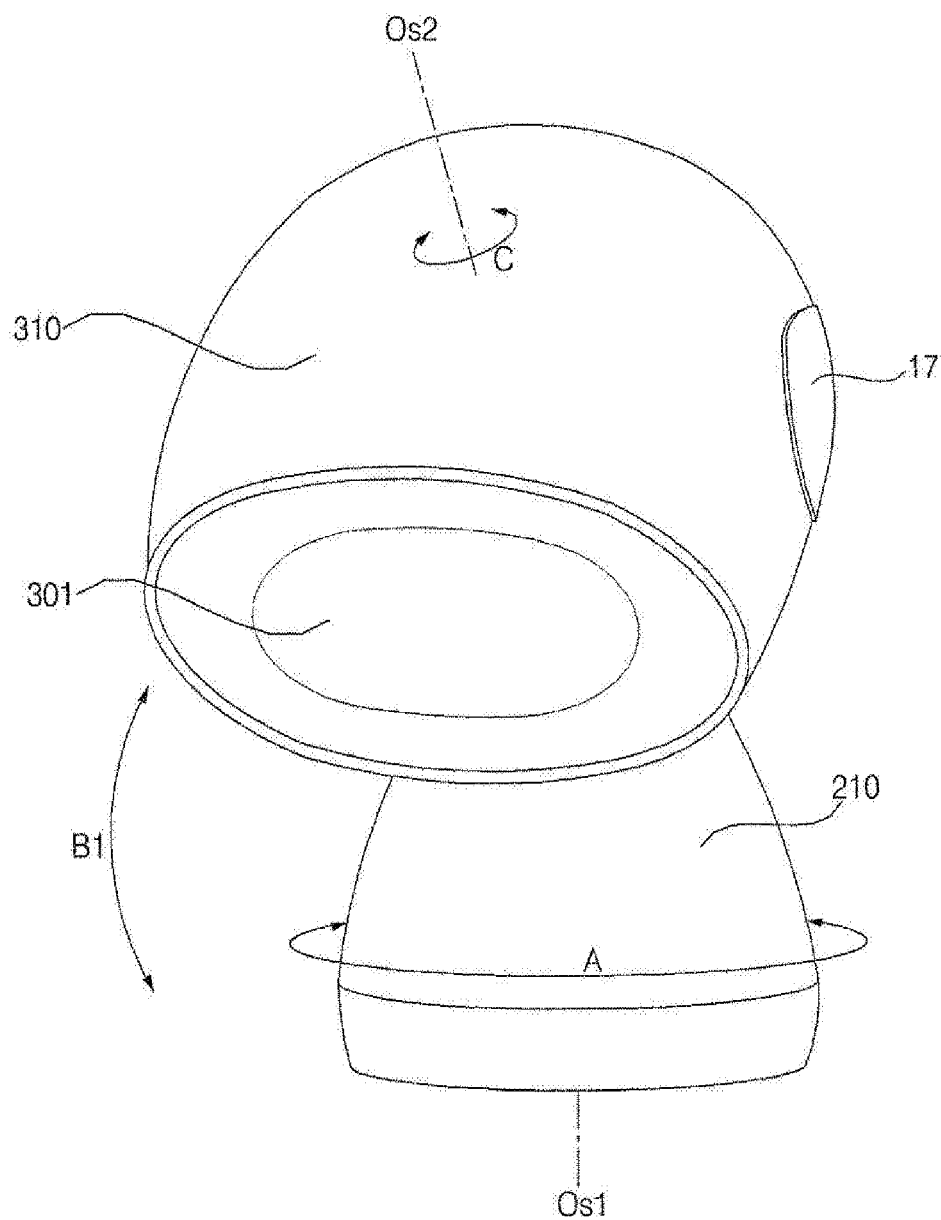
Figure 5B:
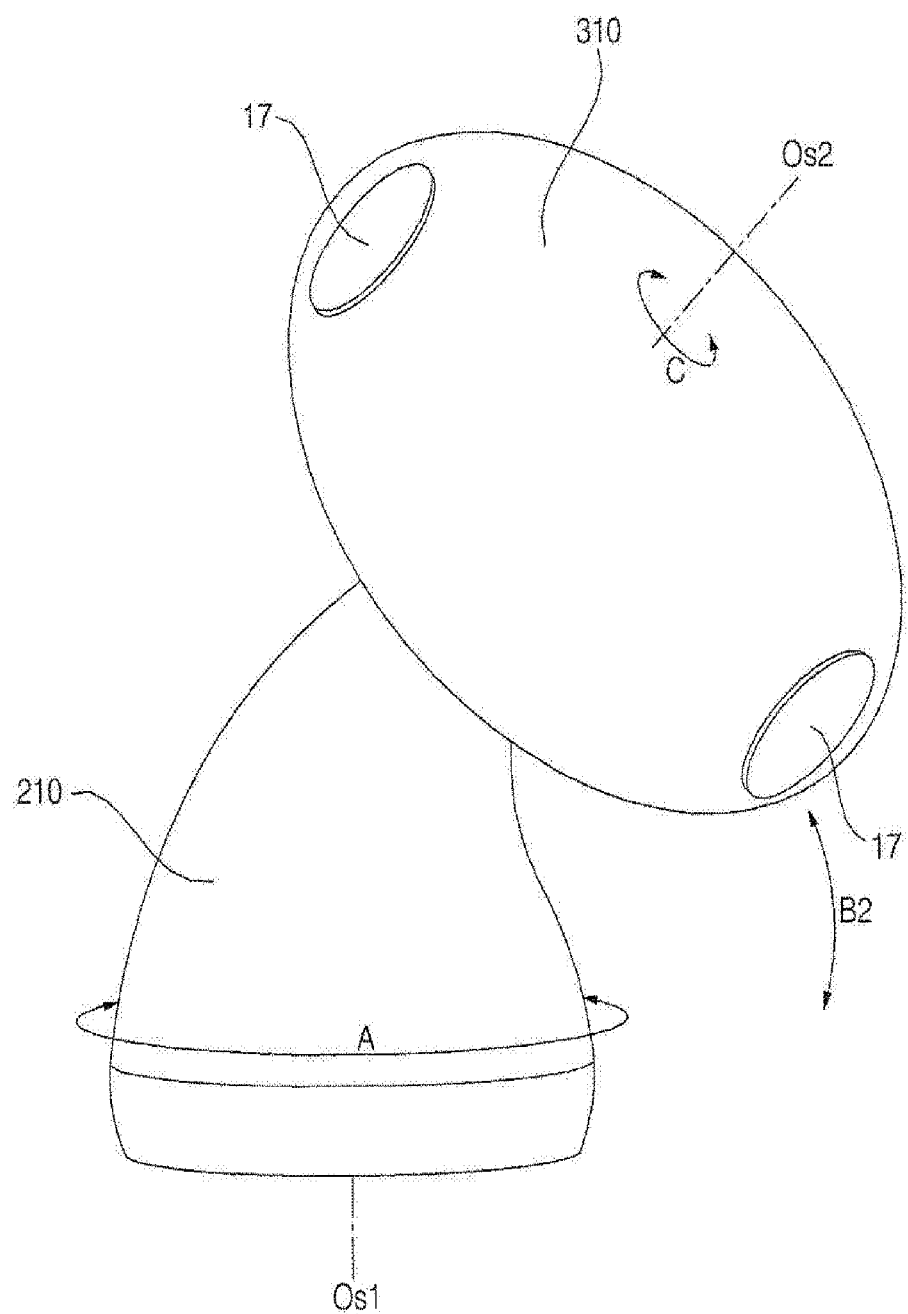

In the case in which the image output direction of the display body 300 is defined as the forward direction, the display body 300 rotates about the second spin rotation axis Os2 relative to the main body 200, whereby the direction in which the main body 200 is inclined is changed. For example, the main body 200 may perform an inclining operation B1 in the forward-rearward direction, as shown in FIG. 5a, or the main body 200 may perform an inclining operation B2 in the leftward-rightward direction, as shown in FIG. 5b.

The second spin rotation axis Os2 is configured to be inclined according to the inclining operation of the main body 200. Consequently, the rotation of the display body 300 about the second spin rotation axis Os2 relative to the main body 200 may be more dynamically seen.

The main body 200 is configured such that the direction in which the upper part thereof is inclined relative to the lower part thereof is limited. In this embodiment, the articulation rotation axis Oj extends in the X-axis direction, and the inclination direction of the main body 200 is limited to the Y-axis direction. As the main body 200 rotates about the first spin rotation axis Os1 relative to the support body 100, the direction in which the upper part of the main body 200 is inclined relative to the support body 100 is changed. In this embodiment, when the main body rotates about the first spin rotation axis Os1 in the state in which the support body 100 is disposed on the ground as is, the direction in which the main body 200 is inclined relative to the support body 100 is changed. Consequently, it is possible to realize a communication robot 1 capable of being inclined in all directions through a relatively simple structure in which the inclination direction is limited.

As the main body 200 is configured to rotate about the first spin rotation axis Os1 (see arrow A), the direction in which the main body 200 is inclined relative to the support body 100 may include two or more axial directions in a forward, rearward, leftward, and rightward plane. Specifically, the inclination direction of the main body 200, i.e. the Y-axis direction, may rotate about the first spin rotation axis Os1, whereby the angle thereof in the forward, rearward, leftward, and rightward plane may be changed. In addition, as the display body 300 is configured to rotate about the second spin rotation axis Os2 relative to the main body 200 (see arrow C), the main body 200 may be inclined in the forward-rearward direction (see arrow B1), as shown in FIG. 5a, or the main body 200 may be inclined in the leftward-rightward direction (see arrow B2), as shown in FIG. 5b.

The communication robot 1 has a first state, in which the first spin rotation axis Os1 and the second spin rotation axis Os2 are disposed in parallel, and a second state, in which the second spin rotation axis Os2 is inclined relative to the first spin rotation axis Os1 according to the inclining operation of the main body 200. The main body 200 may stand upright in the first state, and may be inclined to one side in the second state. A bending assembly 240 may stand upright in the first state, and may be inclined to one side in the second state.

The first spin rotation axis Os1 extends in the Z-axis direction. In the first state, the second spin rotation axis Os2 extends in the Z-axis direction. In the second state, the second spin rotation axis Os2 extends in a direction inclined relative to the Z axis. While the state is changed from the first state to the second state, the second spin rotation axis Os2 is gradually inclined relative to the Z axis. In the second state, the angle of the second spin rotation axis Os2 relative to the first spin rotation axis Os1 is less than 180 degrees.

In the first state, the first spin rotation axis Os1 and the second spin rotation axis Os2 are disposed on a substantially single straight line (the central axis O). The first spin rotation axis Os1 is disposed on the central axis O. In the first state, the second spin rotation axis Os2 is disposed on the central axis O. In the second state, the second spin rotation axis Os2 is disposed so as to be inclined relative to the central axis O.

Rotation of the main body 200 about the first spin rotation axis Os1 relative to the support body 100 may be referred to as a first spin operation. Rotation of the display body 300 about the second spin rotation axis Os2 relative to the main body 200 may be referred to as a second spin operation. Inclination of the main body 200 in the Y-axis direction may be referred to as a bending operation or an inclining operation.

Figure 4:
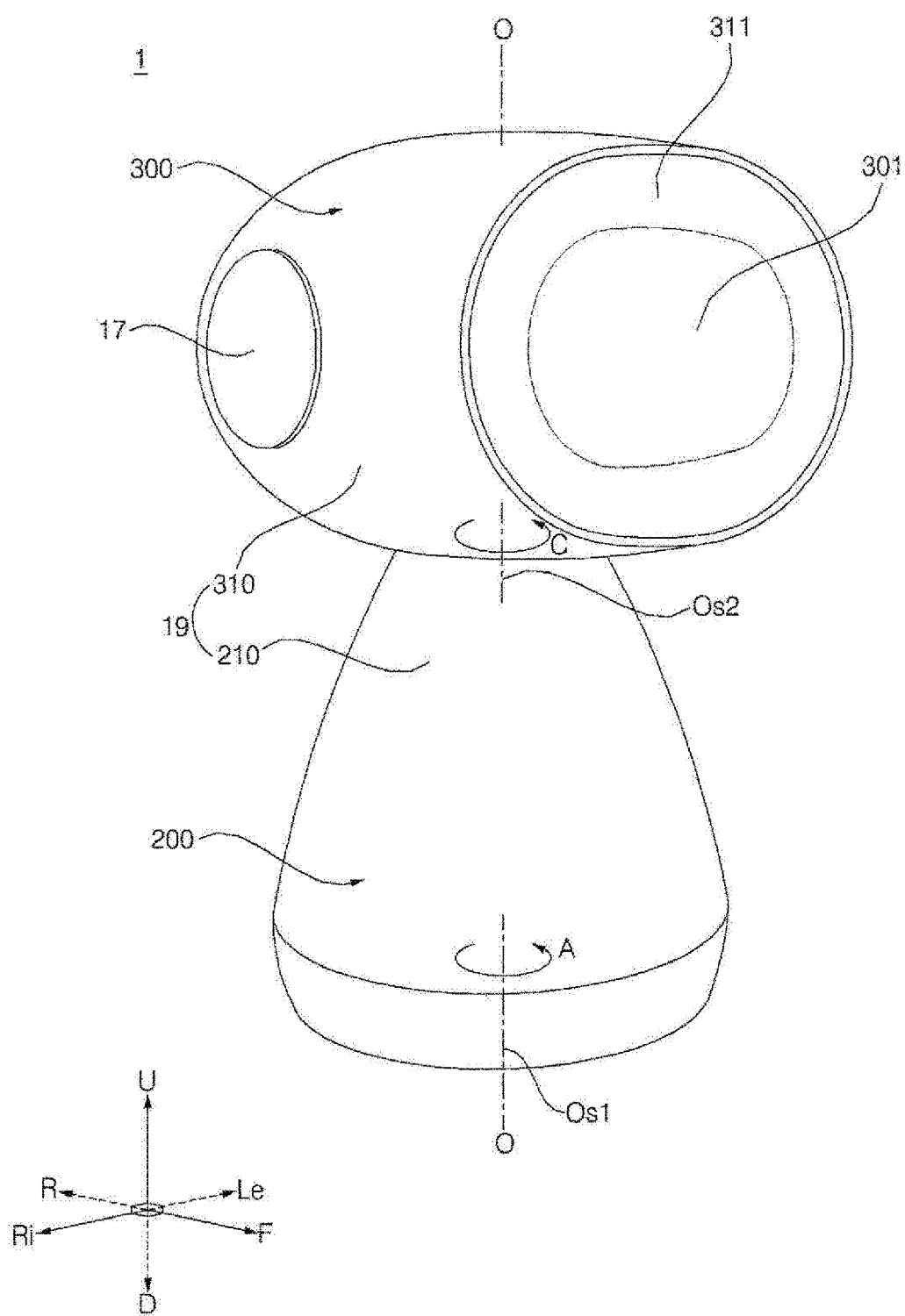
FIG. 4 is a perspective view showing the communication robot 1 according to the embodiment of the present invention.

Referring to FIGS. 4 to 5b, the camera 52 may be disposed at the front surface of the communication robot 1. The camera 52 may be disposed at the front surface of the display body 300. The camera 52 may sense an image in the direction that the display 301 faces.

A microphone hole (not shown) may be formed such that the microphones 53 disposed in the communication robot 1 sense sound. A plurality of microphone holes (not shown) may be formed. First to fourth microphone holes (not shown) may be formed at positions corresponding to the first to fourth microphones 53a, 53b, 53c, and 53d, respectively. The microphones 53 may be disposed so as to be spaced apart from each other in the circumferential direction. The microphone holes may be disposed so as to be spaced apart from each other in the circumferential direction.

The remote control module 33 may be disposed at the display body 300. The optical signal emission direction of the remote control module 33 may be configured so as to be the forward direction of the display body 300. The remote control module 33 may be disposed at the front part of the display body 300. The optical signal emission direction of the remote control module 33 is changed through the first spin operation, the inclining operation, and/or the second spin operation.

An exhaust port (not shown) may be formed in the outer surface of the communication robot 1. The exhaust port may be realized by a group of micro holes. A fan (not shown) may be disposed in the communication robot 1 at a position corresponding to the exhaust port.

A hole (not shown), through which sound from the speaker 46 passes, may be formed in the outer surface of the communication robot 1. The switch 51 may be disposed at the outer surface of the communication robot 1.

The communication robot 1 may include a portion for transmitting light emitted by the LED 17. The LED 17 may be disposed at each of the left and right surfaces of the display body 300.

The communication robot 1 includes a case 19. The case 19 defines the external appearance of the communication robot 1 along the circumference thereof. The case 19 includes a main case 210 fixed to the main body 200. The main case 210 defines the external appearance of the main body 200 along the circumference thereof. The main case 210 may be formed so as to have a shape in which the circumference of the main case gradually increases in size from the upper side to the lower side thereof. The case 19 includes a display case 310 fixed to the display body 300. The display case 310 defines the external appearance of the display body 300 along the circumference thereof. The display case 310 is generally curved. The case 19 may include a lower case (not shown) fixed to the support body 100, and the lower case may be disposed at the lower side of the main case 210 to define the external appearance of the support body 100 along the circumference thereof. In this embodiment, the main case 210 extends downwards to cover the circumference of the support body 100 without the lower case.

The construction of the support body 100 will be described with reference to FIGS. 6a to 12b. The support body 100 may be placed on an external floor. The support body 100 is disposed at the lowermost side of the communication robot 1. The support body 100 rotatably supports the main body 200.

The support body 100 includes a base 110 configured to contact the external floor. A slip prevention portion (not shown) for increasing force of friction to the external floor may be provided at the lower surface of the base 110. The base 110 may be formed in the shape of a plate having a thickness in the upward-downward direction. The base 110 may be circular when viewed from above. The base 110 is disposed at the lowermost side of the communication robot 1. The base 110 supports the first spin driving unit 61. The base 110 supports the battery 180. The base 110 supports a post 130.

The support body 100 includes a main body support unit 120 for supporting the main body 200. The main body support unit 120 may be formed in the shape of a plate having a thickness in the upward-downward direction. The main body support unit 120 may be circular when viewed from above. The main body support unit 120 is disposed at the upper side of the base 110. The main body support unit 120 is disposed so as to be spaced apart from the base 110 in the upward-downward direction. The main body support unit 120 is disposed at the lower side of the main body 200. A hole 120b, through which a motor shaft 61b extends in the upward-downward direction, is formed in the center of the main body support unit 120. The hole 120b is formed along the first spin rotation axis Os1. A wiring through-hole 120a is formed in the main body support unit 120 along the circumference of the hole 120b. The wiring through-hole 120a is formed so as to be spaced apart from the hole 120b. The wiring through-hole 120a may be formed in a fan shape. The wiring through-hole 120a extends in a rotational direction about the first spin rotation axis Os1. The wiring through-hole 120a is formed such that opposite ends thereof are spaced apart from each other in the extension direction. A wire (a power cable, etc.) connected from the support body 100 to the main body 200 extends through the wiring through-hole 120a. When the main body 200 rotates relative to the support body 100, the wire moves along the wiring through-hole 120a.

The support body 100 includes a post 130 for supporting the main body support unit 120. The lower end of the post 130 is coupled to the base 110. The upper end of the post 130 is coupled to the main body support unit 120. The post 130 is disposed between the base 110 and the main body support unit 120. The post 130 extends in the upward-downward direction. A plurality of posts 130 is disposed so as to be spaced apart from each other in the circumferential direction.

The communication robot 1 includes a first spin driving unit 61 for providing driving force necessary for the first spin operation. In this embodiment, the first spin driving unit 61 is disposed at the support body 100. The first spin driving unit 61 includes a motor 61a. The motor 61a is fixed to the support body 100. The first spin driving unit 61 includes a motor shaft 61b connected to a rotation axis of the motor 61a. The motor shaft 61b is disposed on the first spin rotation axis Os1 so as to be rotatable. One end of the motor shaft 61b is coupled to the motor 61a, and the other of the motor shaft is coupled to the main body 200. In addition, the battery 180 may be disposed at the support body 100. The battery 180 supplies electricity to the first spin driving unit 61. The battery 180 supplies electricity to the second spin driving unit 63 and the motion driving unit 62 through the wire.

Hereinafter, the construction of the main body 200 will be described with reference to FIGS. 6a to 16. The main body 200 is supported by the support body 100. The main body 200 is disposed at the upper side of the support body 100. The main body 200 supports the display body 300. The main body 200 is disposed at the lower side of the display body 300. The main body 200 is disposed between the support body 100 and the display body 300.

The main body 200 includes a main case 210, which defines the external appearance thereof. The main case 210 is configured to rotate about the first spin rotation axis Os1 together with the main body 200. The main case 210 includes a first fixing portion 210a fixed to the upper part of the bending assembly 240. The main case 210 includes a second fixing portion 210b fixed to a spin assembly 220. The first fixing portion 210a is disposed at the upper part of the main case 210. The second fixing portion 210b is disposed at the lower part of the main case 210. The main case 210 is configured to be bendable according to the inclining operation. The main case 210 is configured to be bent according to the bending operation of the bending assembly 240. The main case 210 is configured to be elastically bendable during the bending operation. The main case 210 may be made of a flexible material such that the bending operation is possible. Moment caused by the bending operation of the bending assembly 240 may be transmitted to the main case 210 through the first fixing portion 210a and the second fixing portion 210b of the main case 210.

The main body 200 includes a spin assembly 220 coupled to the support body 100 so as to be rotatable about the first spin rotation axis Os1. The spin assembly 220 is supported by the support body 100 so as to be rotatable about the first spin rotation axis Os1 in the leftward-rightward direction. The spin assembly 220 supports the bending assembly 240. The lower end of the bending assembly 240 is coupled to the central part of the spin assembly 220.

The spin assembly 220 includes a spin frame 221 coupled to the support body 100 so as to be rotatable about the first spin rotation axis Os1. The spin frame 221 is formed in the shape of a plate having a thickness in the upward-downward direction. The spin frame 221 is circular when viewed from above. The spin frame 221 is disposed at the upper side of the main body support unit 120. A motor shaft connection portion 224, through which the motor shaft 61b extends in the upward-downward direction, is formed in the center of the spin frame 221. The motor shaft connection portion 224 is disposed on the first spin rotation axis Os1. A wiring hole 220a is formed in the spin frame 221 along the circumference of the motor shaft connection portion 224. The wiring hole 220a is formed so as to be spaced apart from the motor shaft connection portion 224. The wiring hole 220a may be formed in a fan shape. The wiring hole 220a extends in a rotational direction about the first spin rotation axis Os1. The wiring hole 220a is formed such that opposite ends thereof are spaced apart from each other in the extension direction. A wire (a power cable, etc.) connected from the support body 100 to the main body 200 extends through the wiring hole 220a. When the main body 200 rotates relative to the support body 100, the wire moves along the wiring hole 220a.

One of the main body support unit 120 and the spin frame 221 forms a plane perpendicular to the first spin rotation axis Os1, and the other includes a roller 222 disposed so as to roll along the plane. In this embodiment, the main body support unit 120 forms a plane perpendicular to the first spin rotation axis Os1. The upper surface of the main body support unit 120 forms a plane perpendicular to the first spin rotation axis. In addition, the spin frame 221 includes a roller 222 disposed so as to roll along the plane of the main body support unit 120. The roller 222 is configured to roll along the plane while moving in the circumferential direction.

The spin frame 221 includes a roller shaft 222a disposed so as to extend through a rotation axis of the roller 222. The roller shaft 222a extends in the centrifugal direction. The spin frame 221 includes a roller support portion 223, to which the roller shaft 222a is coupled. The roller support portion 223 may be formed such that the thickness thereof is larger than the other portions of the spin frame 221 in the upward-downward direction. The roller 222 is configured to be rotatable about the roller shaft 222a. A plurality of rollers 222 is disposed so as to be spaced apart from each other in the circumferential direction. Roller shafts 222a and roller support portions 223 corresponding to the rollers 222 are provided. The main body support unit 120 has an upper surface that is formed along the rotational track of the roller 222 and that is perpendicular to the first spin rotation axis Os1.

The spin frame 221 includes a rotary base connection portion 225 connected to the bending assembly 240. The rotary base connection portion 225 is disposed at the central part of the spin frame 221. The rotary base connection portion 225 is disposed in the centrifugal direction of the wiring hole 220a. The rotary base connection portion 225 is formed so as to extend in the circumferential direction. The rotary base connection portion 225 may be formed so as to be thicker than the other portions of the spin frame 221 in the upward-downward direction. A plurality of fastening holes 226 is formed in the rotary base connection portion 225. The lower end of the bending assembly 240 and the rotary base connection portion 225 are coupled to each other by fastening members, such as screws, inserted into the fastening holes 226.

The main body 200 includes a bending assembly, one end of which is coupled to the spin assembly 220 and the other end of which is configured to be inclined relative to the one end thereof. In this embodiment, the lower end of the bending assembly 240 is coupled to the spin assembly 220. The bending assembly 240 is configured such that the upper end thereof can be inclined relative to the lower end thereof.

The bending assembly 240 includes a plurality of rotary bodies 241, 242, and 243 rotatably coupled to each other. The rotary bodies 241, 242, and 243 are coupled so as to be rotatable about the articulation rotation axis Oj. The articulation rotation axis Oj extends in the X-axis direction. The rotary bodies 241, 242, and 243 are connected in a line in a direction perpendicular to the articulation rotation axis Oj. The rotary bodies 241, 242, and 243 are connected in a line in the Z-axis direction in the first state. In this embodiment, the rotary bodies 241, 242, and 243 are connected in a line in the upward-downward direction in the first state.

The rotary bodies include a start rotary body 241 disposed at one end. The rotary bodies include an end rotary body 243 disposed at the other end.

The rotary bodies may further include a middle rotary body 242 disposed between the start rotary body 241 and the end rotary body 243.

In another embodiment, although not shown, the rotary bodies may include only two rotary bodies, and only one articulation rotation axis Oj may be provided. In this case, the rotary bodies may not include the middle rotary body 242, and may include the start rotary body 241 and the end rotary body 243, which are rotatably coupled to each other. Even in this case, the inclining operation is possible.

In this embodiment, the rotary bodies 241, 242, and 243 include three or more rotary bodies. In this case, two or more articulation rotation axes Oj are provided. The rotary bodies 241, 242, and 243 include a start rotary body 241, at least one middle rotary body 242, and an end rotary body 243. The start rotary body 241 is rotatably coupled to one of the at least one middle rotary body 242. The end rotary body 243 is rotatably coupled to one of the at least one middle rotary body 242.

In another embodiment including two middle rotary bodies 242, the start rotary body 241 is rotatably coupled to one of the two middle rotary bodies 242, and the end rotary body 243 is rotatably coupled to the other of the two middle rotary bodies 242.

In another embodiment including three or more middle rotary bodies 242, the start rotary body 241 is rotatably coupled to a middle rotary body disposed at one end, among the middle rotary bodies 242, and the end rotary body 243 is rotatably coupled to a middle rotary body disposed at the other end, among the middle rotary bodies 242. The middle rotary bodies 242 are disposed in a line so as to be rotatably coupled to adjacent ones.

In a further embodiment including n middle rotary bodies 242, the start rotary body 241 is rotatably coupled to a first middle rotary body 242-1, among first to n-th middle rotary bodies 242-1, 242-2, . . . , and 242-$n$, and the end rotary body 243 is rotatably coupled to the n-th middle rotary body 242-$n$, among the first to n-th middle rotary bodies 242-1, 242-2, . . . , and 242-$n$ a natural number equal to or greater than 3). A p-th middle rotary body 242-$p$ is rotatably coupled to a (p−1)th middle rotary body 242-($p$−1), and is rotatably coupled to a (p+1)th middle rotary body 242-($p$+1) (p being a natural number equal to or greater than 2 and less than n−1). One end and the other end of each middle rotary body 242 are rotatably coupled to adjacent rotary bodies. In this case, a total number of n+2 rotary bodies 241, 242, and 243 is provided, and a total number of n+1 articulation rotation axes Oj is provided. In this embodiment, a total number of 10 rotary bodies 241, 242-1, 242-2, 242-3, 242-4, 242-5, 242-6, 242-7, 242-8, and 243 is provided.

Two adjacent rotary bodies are coupled to each other so as to be rotatable about an articulation rotation axis Oj. The articulation rotation axis Oj extends in the X-axis direction. In an embodiment including a plurality of articulation rotation axes Oj1, . . . , the articulation rotation axes Oj1, . . . are disposed in parallel. The articulation rotation axes Oj1, . . . are disposed so as to be spaced apart from each other in the Z-axis direction in the first state. The others of the articulation rotation axes Oj1, . . . , excluding the first articulation rotation axis Oj1, move in the Y-axis direction in the second state. In this embodiment, a total number of 9 articulation rotation axes Oj1, Oj2, Oj3, Oj4, Oj5, Oj6, Oj7, Oj8, and Oj9 is provided.

One of two adjacent rotary bodies includes an articulation portion 241$b$ or 242$b$ protruding to one side, and the other includes a counter-articulation portion 242$c$ or 243$c$ depressed to the one side so as to engage with the articulation portion 241$b$ or 242$b$. The articulation portion of one of the two adjacent rotary bodies is inserted into the counter-articulation portion of the other. The two adjacent rotary bodies are rotatable about the articulation rotation axis through coupling between the articulation portions and the counter-articulation portions. The articulation portion 241$b$ is formed on one of the start rotary body 241 and the end rotary body 243, and the counter-articulation portion 243$c$ is formed in the other.

In this embodiment, the articulation portion is formed on the upper surface of a lower one of the two adjacent rotary bodies, and the counter-articulation portion is formed in the lower surface of the upper rotary body. In addition, the articulation portion 241$b$ is formed on the start rotary body 241, and the counter-articulation portion 243$c$ is formed in the end rotary body 243.

Figure 13:
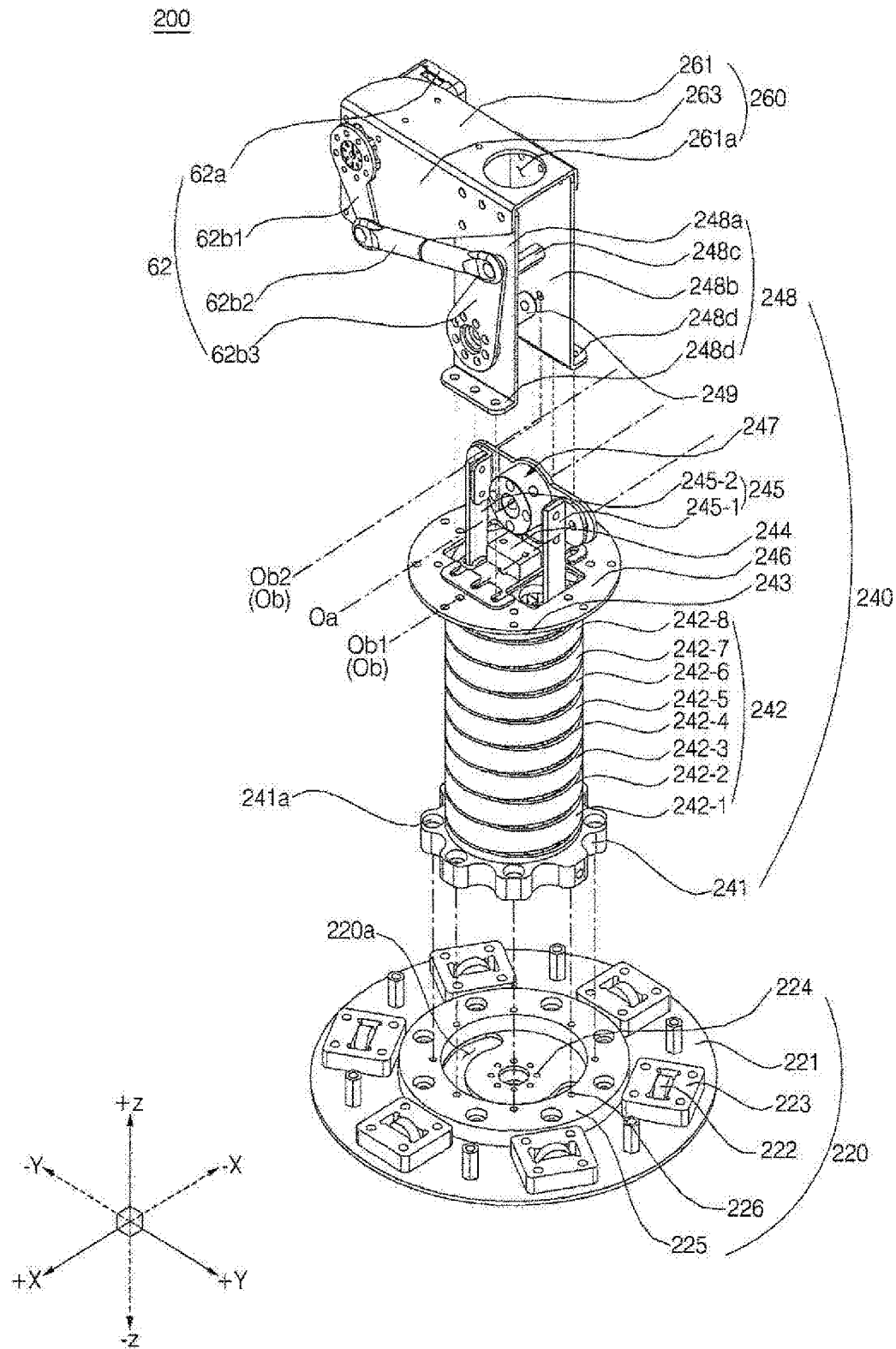

The start rotary body 241 is fixed to the spin assembly 220. Referring to FIG. 13, the start rotary body 241 includes a fastening portion 241$a$ fixed to the rotary base connection portion 225. The fastening portion 241$a$ is formed so as to protrude from the start rotary body 241 in the centrifugal direction. A plurality of fastening portions 241$a$ is arranged in the circumferential direction. Fastening members are inserted through the fastening portions 241$a$, and are then inserted into the fastening holes 226.

Referring to FIGS. 14$a$ and 14$b$, the start rotary body 241 includes an articulation portion 241$b$ protruding from the upper surface thereof in the positive Z-axis direction. The articulation portion 241$b$ is disposed on the first articulation rotation axis Oj1. The articulation portion 241$b$ extends in the X-axis direction. A pair of articulation portions 241$b$ may be disposed so as to be spaced apart from each other in the X-axis direction. The first middle rotary body 242-1 includes a counter-articulation portion 242$c$ depressed in the lower surface thereof so as to correspond to the articulation portion 241$b$. A pair of counter-articulation portions 242$c$ may be disposed so as to be spaced apart from each other in the X-axis direction. In another embodiment, the first middle rotary body may include the articulation portion protruding from the lower surface thereof in the negative Z-axis direction, and the start rotary body may include the counter-articulation portion depressed in the upper surface thereof so as to correspond to the articulation portion of the middle rotary body.

The start rotary body 241 includes a center bar fixing portion 241$p$ for fixing one end of a center bar 244. The center bar fixing portion 241$p$ fixes the lower end of the center bar 244. The center bar 244 may be fixedly disposed in the center bar fixing portion 241$p$ in the state of extending therethrough in the upward-downward direction. The center bar fixing portion 241$p$ is disposed at the central part of the start rotary body 241. The center bar fixing portion 241$p$ is disposed between the pair of articulation portions 241$b$. The center bar fixing portion 241$p$ is disposed between a pair of side bar fixing portions 241$q$-1 and 241$q$-2.

The start rotary body 241 includes a side bar fixing portion 241$q$ for fixing one end of a side bar 245. The side bar fixing portion 241$q$ fixes the lower end of the side bar 245. The side bar 245 may be fixedly disposed in the side bar fixing portion 241$q$ in the state of extending therethrough in the upward-downward direction. The side bar fixing portion 241$q$ is disposed at a position spaced apart from the central part of the start rotary body 241 in the Y-axis direction. A pair of side bar fixing portions 241$q$-1 and 241$q$-2 is disposed so as to be spaced apart from each other in the Y-axis direction. A first side bar fixing portion 241$q$-1 is disposed at a position spaced apart from the center bar fixing portion 241$p$ of the start rotary body 241 in the positive Y-axis direction. A second side bar fixing portion 241$q$-2 is disposed at a position spaced apart from the center bar fixing portion 241$p$ of the start rotary body 241 in the negative Y-axis direction. The first side bar fixing portion 241$q$-1 and the second side bar fixing portion 241$q$-2 are disposed so as to be symmetric with respect to the center bar fixing portion 241$p$. The first side bar fixing portion 241$q$-1 fixes one end of a first side bar 245-1. The second side bar fixing portion 241q-2 fixes one end of a second side bar 245-2.

A wiring hole 241r, through which the wire extends in the upward-downward direction, is formed in the start rotary body 241. A plurality of wiring holes 241r may be disposed so as to be spaced apart from each other in the circumferential direction. The wiring hole 241r is disposed at a position spaced apart from the central part of the start rotary body 241. The wiring hole 241r is disposed at a position spaced apart from the articulation portion 241b, the center bar fixing portion 241p, and the side bar fixing portion 241q.

A middle rotary body 242-1 rotatably coupled to the start rotary body 241 is provided. A middle rotary body 242-8 rotatably coupled to the end rotary body 243 is provided. Middle rotary bodies 242-2, 242-3, 242-4, 242-5, 242-6, and 242-7, one end and the other end of which are rotatably coupled to other middle rotary bodies, are provided.

A plurality of middle rotary bodies 242 may be provided. First to m-th middle rotary bodies 242-1, . . . , and 242-m may be rotatably coupled to each other in a line (m being a natural number equal to or great than 2). In this case, the start rotary body 241 is rotatably coupled to the first middle rotary body 242-1, and the end rotary body 243 is rotatably coupled to the m-th middle rotary body 242-m. One end of one middle rotary body 242 is rotatably coupled to a rotary body adjacent thereto, and the other end thereof is rotatably coupled to another rotary body adjacent thereto.

Referring to FIG. 10, in this embodiment, one end of the first middle rotary body 242-1 is coupled to the start rotary body 241 so as to be rotatable about the first articulation rotation axis Oj1. The other end of the first middle rotary body 242-1 is coupled to one end of the second middle rotary body 242-2 so as to be rotatable about the second articulation rotation axis Oj2. The other end of the second middle rotary body 242-2 is coupled to one end of the third middle rotary body 242-3 so as to be rotatable about the third articulation rotation axis Oj3. The other end of the third middle rotary body 242-3 is coupled to one end of the fourth middle rotary body 242-4 so as to be rotatable about the fourth articulation rotation axis Oj4. The other end of the fourth middle rotary body 242-4 is coupled to one end of the fifth middle rotary body 242-5 so as to be rotatable about the fifth articulation rotation axis Oj5. The other end of the fifth middle rotary body 242-5 is coupled to one end of the sixth middle rotary body 242-6 so as to be rotatable about the sixth articulation rotation axis Oj6. The other end of the sixth middle rotary body 242-6 is coupled to one end of the seventh middle rotary body 242-7 so as to be rotatable about the seventh articulation rotation axis Oj7. The other end of the seventh middle rotary body 242-7 is coupled to one end of the eighth middle rotary body 242-8 so as to be rotatable about the eighth articulation rotation axis Oj8. The other end of the eighth middle rotary body 242-8 is coupled to the end rotary body 243 so as to be rotatable about the ninth articulation rotation axis Oj9.

Hereinafter, a middle rotary body 242 will be described in detail with reference to FIGS. 14a to 20. The middle rotary body 242 is generally formed so as to have a cylindrical shape. The middle rotary body 242 includes an articulation portion 242b protruding to one side. The middle rotary body 242 includes a counter-articulation portion 242c depressed in the other side so as to engage with the articulation portion 242b. In this embodiment, the articulation portion 242b is formed on the upper surface of the middle rotary body 242, and the counter-articulation portion 242c is formed in the lower surface of the middle rotary body 242.

The middle rotary body 242 includes an articulation portion 242b protruding from the upper surface thereof in the positive Z-axis direction. The articulation portion 242b is disposed on the first articulation rotation axis Oj1. The articulation portion 242b extends in the X-axis direction. The counter-articulation portion 242c extends in the X-axis direction. A pair of articulation portions 242b1 and 242b2 may be disposed so as to be spaced apart from each other in the X-axis direction. The first middle rotary body 242-1 includes a counter-articulation portion 242c depressed in the lower surface thereof so as to correspond to the articulation portion 242b. A pair of counter-articulation portions 242c1 and 242c2 may be disposed so as to be spaced apart from each other in the X-axis direction.

A center bar through-hole 242p, through which the center bar 244 extends, is formed in the middle rotary body 242. The center bar through-hole 242p is disposed at the central part of the middle rotary body 242. The center bar through-hole 242p is formed through the middle rotary body 242 in the upward-downward direction. The center bar through-hole 242p is disposed between the pair of articulation portions 242b1 and 242b2. The center bar through-hole 242p is disposed between a pair of side bar guides 242q-1 and 242q-2.

The rotary bodies include guides 242q and 243q for guiding the operation of the side bars 245 when a motion member 247 is operated. The guides 242q and 243q include a side bar guide 242q provided at the middle rotary body 242. The side bar guide 242q guides movement of the side bar 245 relative to the middle rotary body 242. The side bar guide 242q guides movement of the middle rotary body 242 relative to the side bar 245. Specifically, when the bending operation is performed, the side bar 245 is bent while moving along the side bar guide 242q. A side bar through-hole 242q, through which the side bar 245 extends in the upward-downward direction, may be formed in the side bar guide 242q. The side bar guide 242q is disposed at a position spaced apart from the central part of the middle rotary body 242 in the Y-axis direction. A pair of side bar guides 242q-1 and 242q-2 is disposed so as to be spaced apart from each other in the Y-axis direction. A first side bar guide 242q-1 is disposed at a position spaced apart from the center bar through-hole 242p of the middle rotary body 242 in the positive Y-axis direction. A second side bar guide 242q-2 is disposed at a position spaced apart from the center bar through-hole 242p of the middle rotary body 242 in the negative Y-axis direction. The first side bar guide 242q-1 and the second side bar guide 242q-2 are disposed so as to be symmetric with respect to the center bar through-hole 242p. The first side bar guide 242q-1 guides the first side bar 245-1. A first side bar through-hole 242q-1, through which the first side bar 245-1 extends in the upward-downward direction, may be formed in the first side bar guide 242q-1. The second side bar guide 242q-2 guides the second side bar 245-2. A second side bar through-hole 242q-2, through which the second side bar 245-2 extends in the upward-downward direction, may be formed in the second side bar guide 242q-2.

A wiring hole 242r, through which the wire extends in the upward-downward direction, is formed in the middle rotary body 242. A plurality of wiring holes 242r may be disposed so as to be spaced apart from each other in the circumferential direction. The wiring hole 242r is disposed at a position spaced apart from the central part of the middle rotary body 242. The wiring hole 242r is formed at a position spaced apart from the articulation portion 242b, the center bar through-hole 242p, and the side bar guide 242q.

In addition to the wiring hole 242r, an additional hole 242s may be formed in the middle rotary body 242. The additional hole 242s is formed through the middle rotary body 242 in the upward-downward direction.

The middle rotary body 242 includes a side surface 242f extending in the circumferential direction. The side surface 242f is a surface that faces the circumferential direction.

The middle rotary body 242 includes a one-end contact portion 242g formed so as to contact a rotary body adjacent thereto and an other-end contact portion 242h formed so as to contact another rotary body adjacent thereto. In the first state, the one-end contact portion 242g becomes the upper end of the middle rotary body 242, and the other-end contact portion 242h becomes the lower end of the middle rotary body 242.

At least one of the one-end contact portion 242g or the other-end contact portion 242h forms an inclined portion 242i for limiting a range of rotation of an adjacent rotary body. When viewed in the X-axis direction, the inclined portion 242i includes a first inclined portion 242i1 for forming inclination in the positive Y-axis direction and a second inclined portion 242i2 for forming inclination in the negative Y-axis direction. When viewed in the X-axis direction, the inclined portion 242i is formed such that the length of the middle rotary body 242 in the Z-axis direction gradually decreases as the distance from the center of the middle rotary body 242 in the Y-axis direction increases. In this embodiment, the inclined portion 242i is formed at the one-end contact portion 242g, the first inclined portion 242i1 is inclined downwards in the positive Y-axis direction, and the second inclined portion 242i2 is inclined downwards in the negative Y-axis direction. In addition, the upper end of the start rotary body 241 may be formed so as to have the same shape as the inclined portion. In another embodiment, the inclined portion 242i may be formed at the other-end contact portion 242h, the first inclined portion 242i1 may be inclined upwards in the positive Y-axis direction, and the second inclined portion 242i2 may be inclined upwards in the negative Y-axis direction.

The one-end contact portion 242g and the other-end contact portion 242h of one of two adjacent rotary bodies are spaced apart from each other in the first state. When the bending assembly 240 is maximally inclined in the second state, the one-end contact portion 242g and the other-end contact portion 242h of one of the two adjacent rotary bodies contact each other. When the bending assembly 240 is maximally inclined in the second state, the inclined portion 242i of one of the two adjacent rotary bodies contacts the end of the other, whereby the maximum rotational angle of the two adjacent rotary bodies is limited.

The end rotary body 243 is rotatably coupled to the middle rotary body 242. The end rotary body 243 is rotatably coupled to a middle rotary body 242 disposed at the upper end, among a plurality of middle rotary bodies 242. The end rotary body 243 supports a fixing member 246. The end rotary body 243 supports a motion frame 248. The end rotary body 243 supports a support frame 260. The end rotary body 243 supports the display body 300.

Figure 14A:
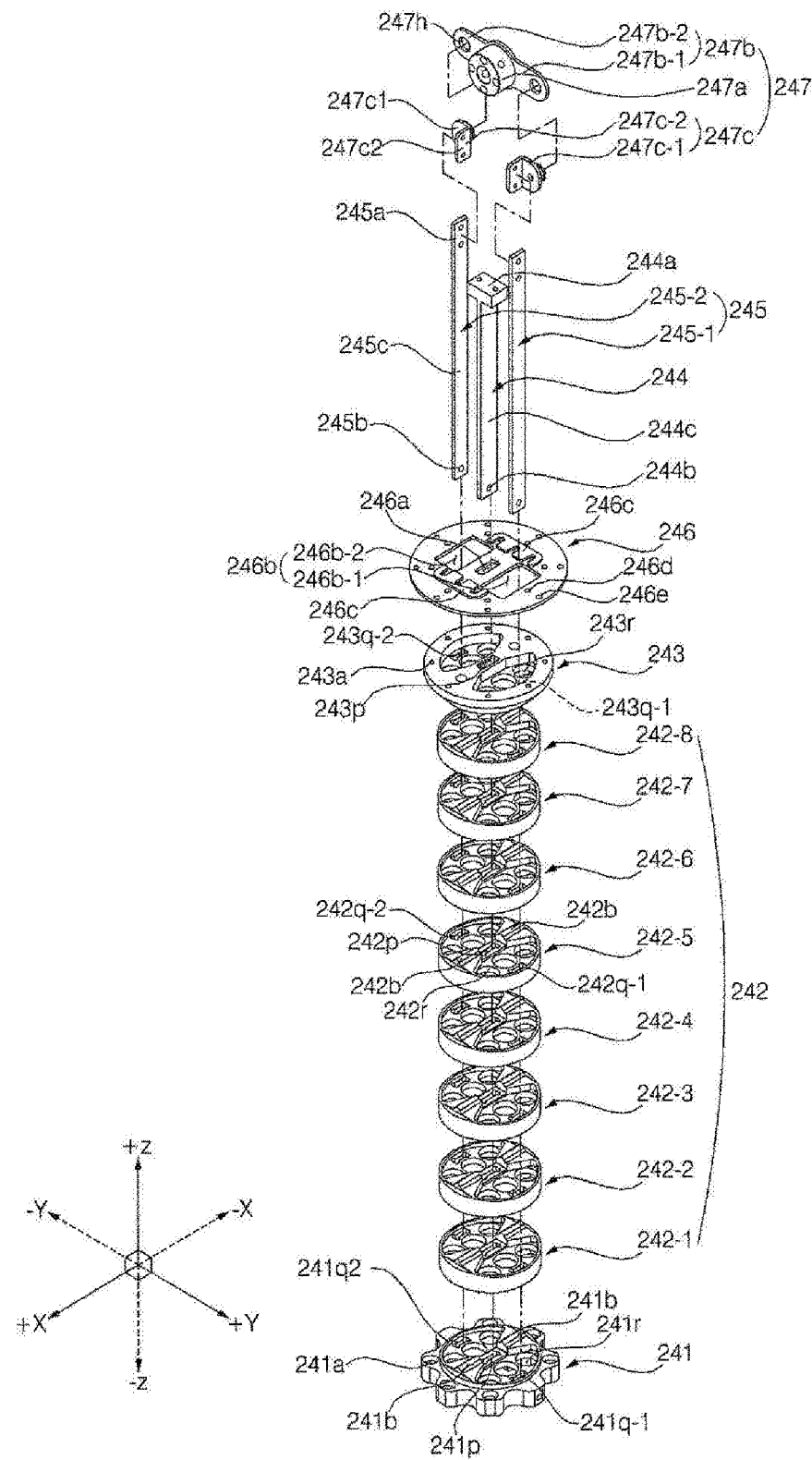
FIGS. 14a and 14b are exploded perspective views of a bending assembly 240 of FIG. 13.
Figure 14B:
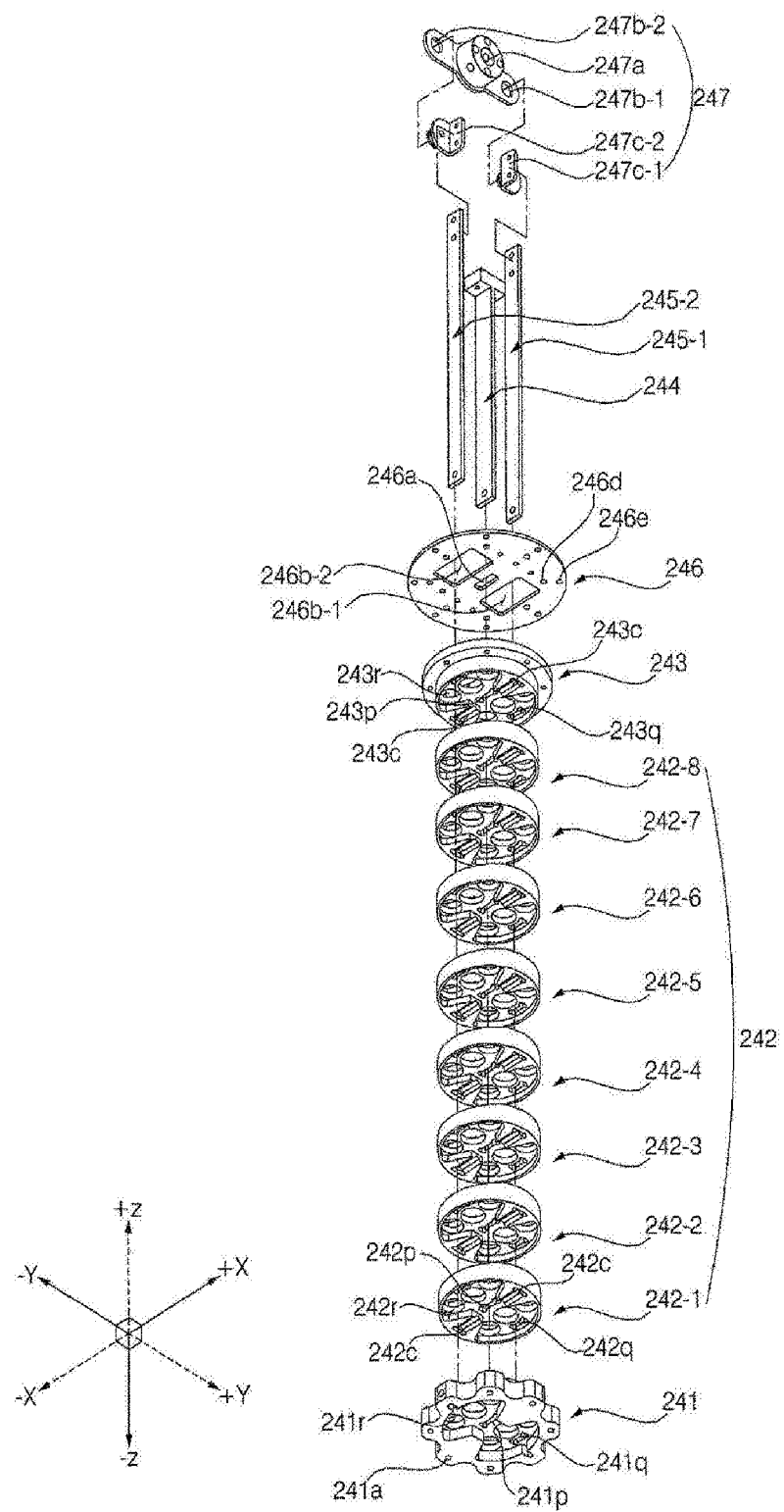
Figure 15:
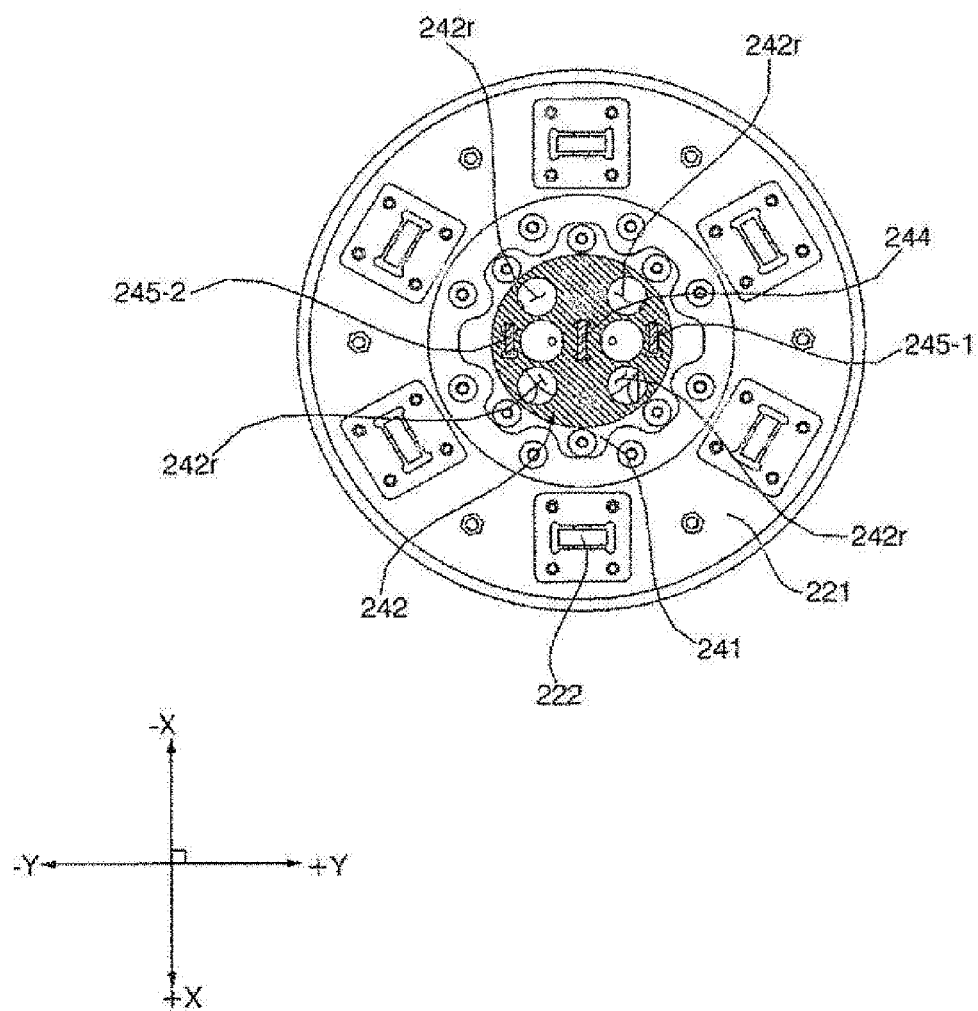
FIG. 15 is a horizontal sectional view of the communication robot 1 taken along line S4-S4' of FIG. 8.
Figure 16:
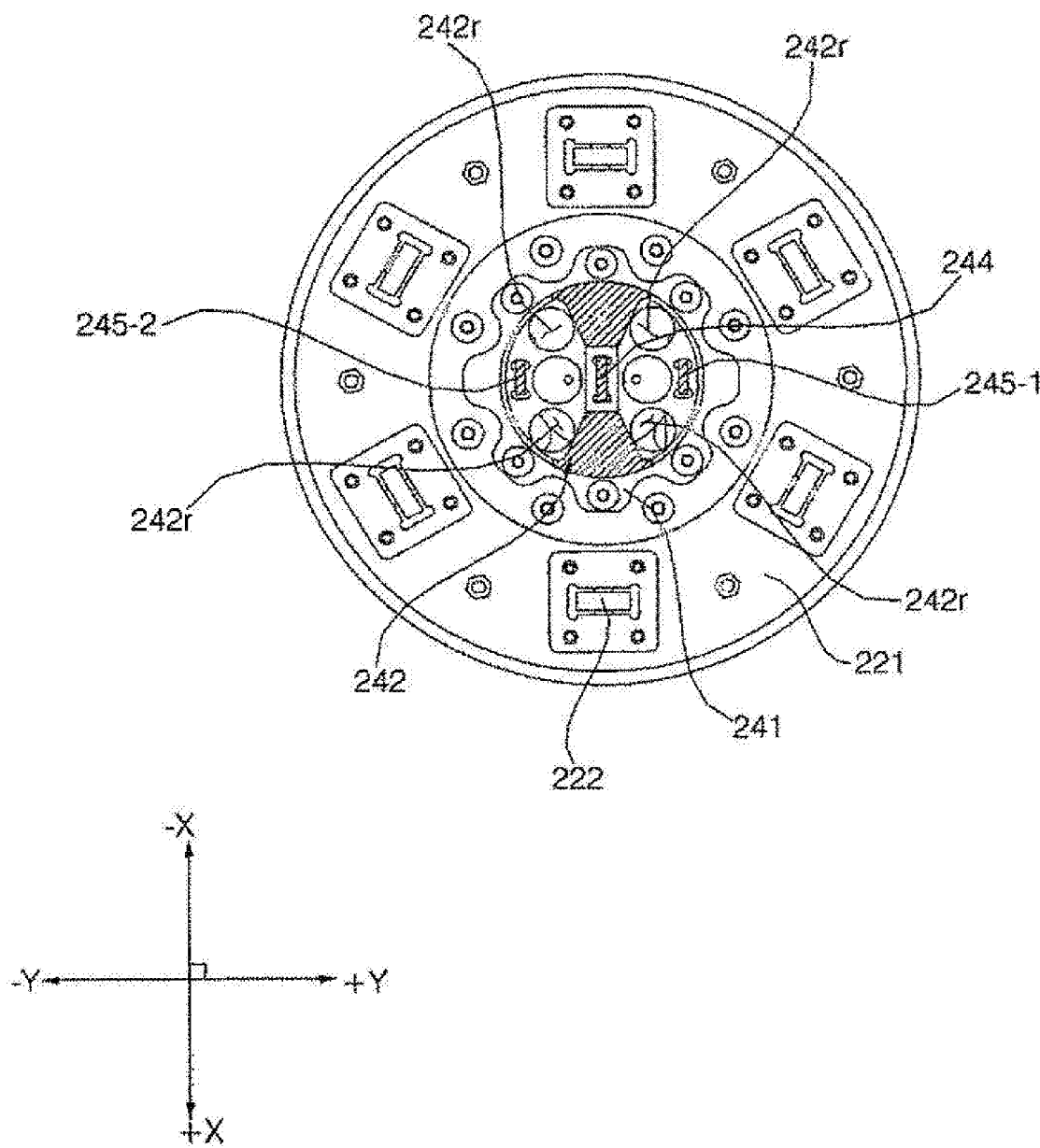
FIG. 16 is a horizontal sectional view of the communication robot 1 taken along line S5-S5' of FIG. 8.
Figure 17:
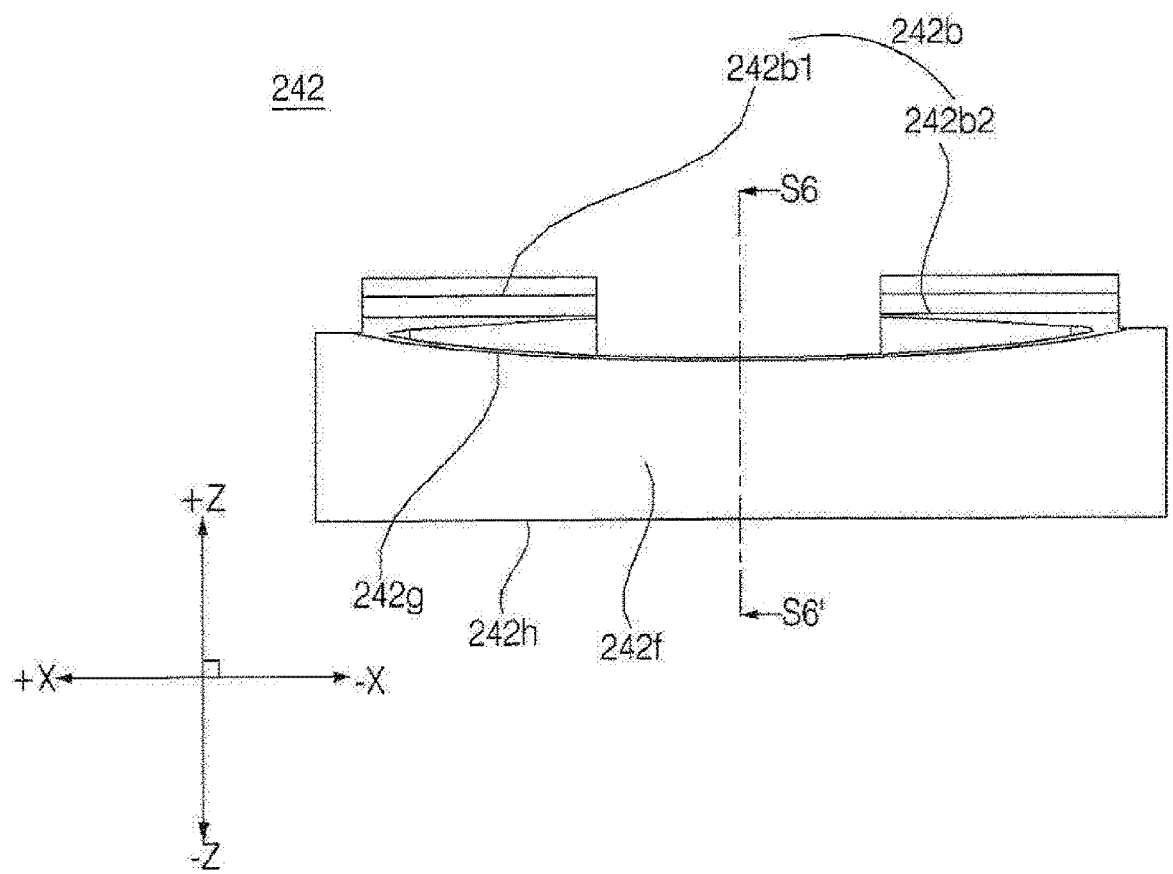
FIG. 17 is an elevation view of a middle rotary body 242 of FIG. 14a when viewed in the positive Y-axis direction.
Figure 18:
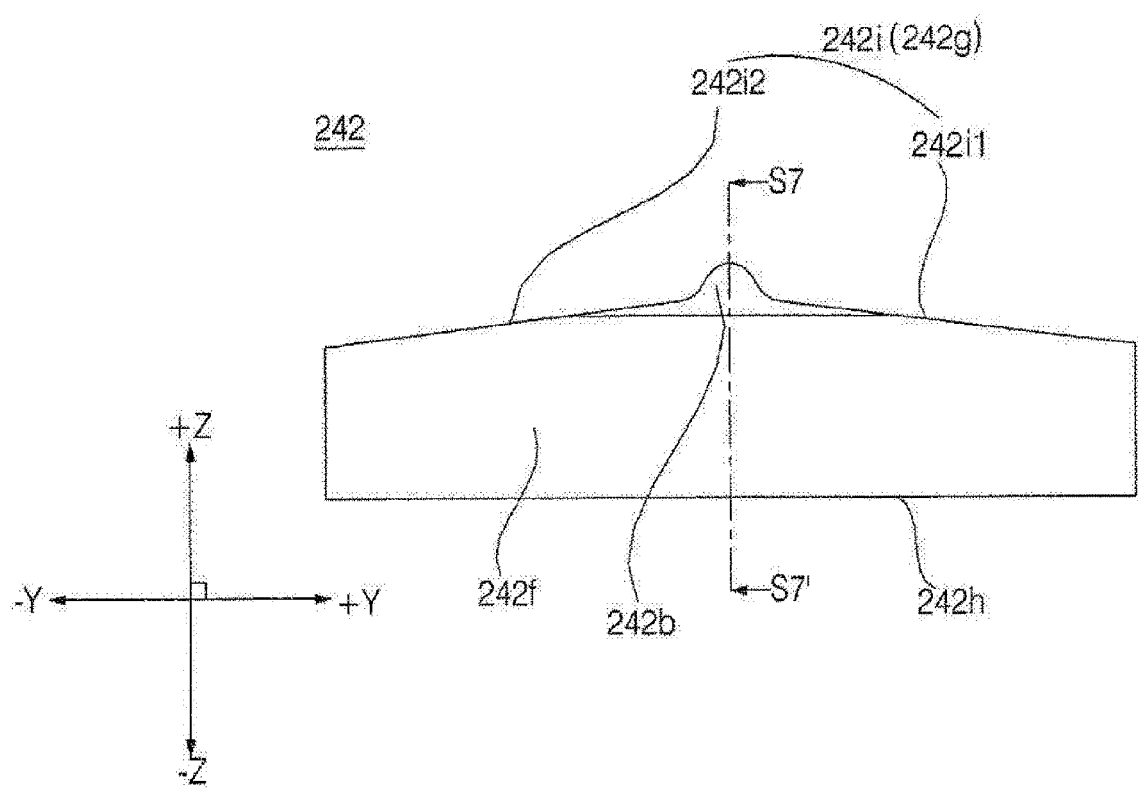
FIG. 18 is an elevation view of the middle rotary body 242 of FIG. 14a when viewed in the positive X-axis direction.
Figure 19:
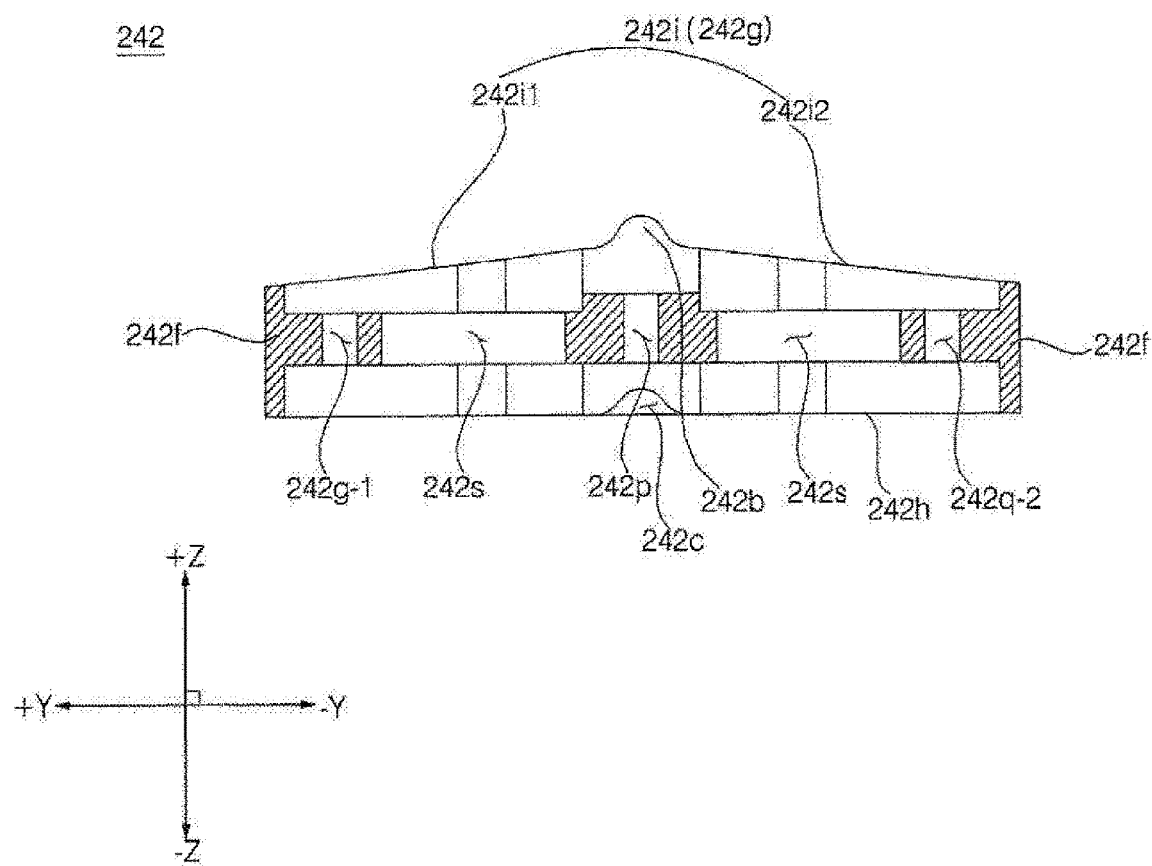
FIG. 19 is a vertical sectional view of the middle rotary body 242 taken along line S6-S6' of FIG. 17.
Figure 20:
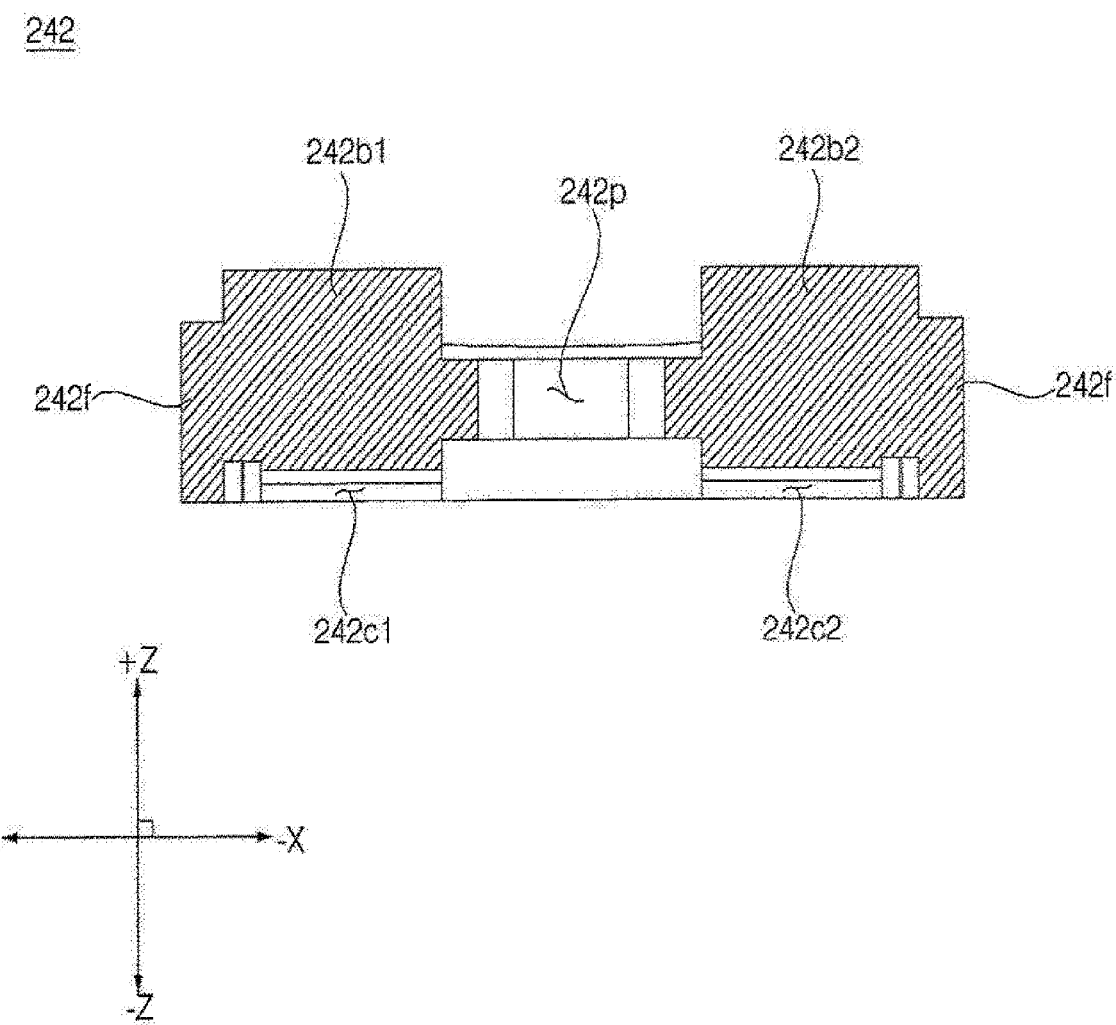
FIG. 20 is a vertical sectional view of the middle rotary body 242 taken along line S7-S7' of FIG. 18.

The end rotary body 243 fixes the fixing member 246. Referring to FIGS. 14a and 14b, the end rotary body 243 includes a fastening portion 243a for fixing the fixing member 246. The fastening portion 243a is formed so as to protrude from the end rotary body 243 in the centrifugal direction. A plurality of fastening portions 243a is arranged in the circumferential direction. Fastening members extend through the fastening portions 243a in the upward-downward direction, and are fastened to an end rotary body fixing portion 246d.

Referring to FIGS. 14a and 14b, the end rotary body 243 includes a counter-articulation portion 243c depressed in one side so as to engage with the articulation portion 242b of the middle rotary body 242. In this embodiment, the counter-articulation portion 243c is formed in the lower surface of the end rotary body 243. The end rotary body 243 includes a counter-articulation portion 243c depressed in the upper surface thereof in the positive Z-axis direction. The counter-articulation portion 243c is disposed on the articulation rotation axis Oj9. The counter-articulation portion 243c extends in the X-axis direction. The eighth middle rotary body 242-8 includes an articulation portion 242b protruding from the upper surface thereof so as to correspond to the counter-articulation portion 243c. A pair of counter-articulation portions 243c may be disposed so as to be spaced apart from each other in the X-axis direction.

A center bar through-hole 243p, through which the center bar 244 extends, is formed in the end rotary body 243. The center bar through-hole 243p is disposed at the central part of the end rotary body 243. The center bar through-hole 243p is formed through the end rotary body 243 in the upward-downward direction. The center bar through-hole 243p is disposed between the pair of counter-articulation portions 243c. The center bar through-hole 243p is disposed between a pair of side bar guides 243q-1 and 243q-2.

The guides 242q and 243q include a side bar guide 243q provided at the end rotary body 243. The side bar guide 243q guides movement of the side bar 245 relative to the end rotary body 243. The side bar guide 243q guides movement of the end rotary body 243 relative to the side bar 245. Specifically, when the bending operation is performed, the side bar 245 is bent while moving along the side bar guide 243q. A side bar through-hole 243q, through which the side bar 245 extends in the upward-downward direction, may be formed in the side bar guide 243q. The side bar guide 243q is disposed at a position spaced apart from the central part of the end rotary body 243 in the Y-axis direction. A pair of side bar guides 243q-1 and 243q-2 is disposed so as to be spaced apart from each other in the Y-axis direction. A first side bar guide 243q-1 is disposed at a position spaced apart from the center bar through-hole 243p of the end rotary body 243 in the positive Y-axis direction. A second side bar guide 243q-2 is disposed at a position spaced apart from the center bar through-hole 243p of the end rotary body 243 in the negative Y-axis direction. The first side bar guide 243q-1 and the second side bar guide 243q-2 are disposed so as to be symmetric with respect to the center bar through-hole 243p. The first side bar guide 243q-1 guides the first side bar 245-1. A first side bar through-hole 243q-1, through which the first side bar 245-1 extends in the upward-downward direction, may be formed in the first side bar guide 243q-1. The second side bar guide 243q-2 guides the second side bar 245-2. A second side bar through-hole 243q-1 through which the second side bar 245-2 extends in the upward-downward direction, may be formed in the second side bar guide 243q-2.

The bending assembly 240 includes a center bar 244 extending through the rotary bodies 241, 242, and 243. The center bar 244 is disposed so as to cross the articulation rotation axis Oj. The center bar 244 is disposed so as to cross the articulation rotation axes Oj1, Oj2, . . . . The center bar 244 is disposed so as to extend through the central parts of the rotary bodies 241, 242, and 243.

The center bar 244 is configured to be bent when the rotary bodies 241, 242, and 243 rotate. The center bar 244 is disposed so as to extend through the central parts of the rotary bodies 241, 242, and 243 in the first state and the second state. The center bar 244 is configured to be bent in the second state. The center bar 244 is made of a flexible material such that the center bar can be elastically bent in the second state.

One end of the center bar 244 is fixed to the start rotary body 241. Here, "one end of the center bar is fixed to the start rotary body" is a meaning including an example in which one end of the center bar 244 is directly fastened to the start rotary body 241 and an example in which one end of the center bar 244 is fastened to another member fastened to the start rotary body 241. In this embodiment, the lower end of the center bar 244 is directly fastened to the start rotary body 241.

The other end of the center bar 244 is fixed to the end rotary body 243. Here, "the other end of the center bar is fixed to the end rotary body" is a meaning including an example in which the other end of the center bar 244 is directly fastened to the end rotary body 243 and an example in which the other end of the center bar 244 is fastened to another member fastened to the end rotary body 243. In this embodiment, the lower end of the center bar 244 is directly fastened to the start rotary body 241.

The center bar 244 includes an upper-end fixing portion 244a fixed to the end rotary body 243. The upper-end fixing portion 244a is fastened to the fixing member 246. The upper-end fixing portion 244a is formed so as to have a larger area in an XY plane than an extension 244c, whereby the upper-end fixing portion is caught in a hole formed in a center bar fixing portion 246a of the fixing member 246. The upper-end fixing portion 244a is formed at the upper end of the center bar 244.

The center bar 244 includes a lower-end fixing portion 244b fixed to the start rotary body 241. The lower-end fixing portion 244b is fastened to the center bar fixing portion 241p of the start rotary body 241. The lower-end fixing portion 244b is formed at the lower end of the center bar 244.

The center bar 244 includes an extension 244c extending to interconnect the upper-end fixing portion 244a and the lower-end fixing portion 244b. The extension 244c is formed so as to extend in the upward-downward direction in the first state. The extension 244c is formed such that the Y-axis length of the extension is shorter than the X-axis length of the extension. The extension 244c is disposed so as to extend through the rotary bodies 242 and 243. The extension 244c is disposed so as to extend through the end rotary body 243. The extension 244c is disposed so as to extend through the middle rotary body 242. The extension 244c is made of a flexible material such that the extension can be elastically bent in the second state.

The bending assembly 240 includes a side bar 245 disposed at a position spaced apart from the articulation rotation axis Oj. The side bar 245 is disposed at a position spaced apart from the articulation rotation axis Oj in the Y-axis direction in the first state. The side bar 245 is disposed at a position spaced apart from the articulation rotation axes Oj1, Oj2, . . . in the Y-axis direction.

The side bar 245 extends in the direction in which the rotary bodies 241, 242, and 243 are arranged. The side bar 245 extends in the Z-axis direction in the first state. The side bar 245 extends in the upward-downward direction in the first state.

The side bar 245 is configured to be bent when the rotary bodies 241, 242, and 243 rotate. The side bar 245 is configured to be bent in the second state. The side bar 245 is made of a flexible material such that the side bar can be elastically bent in the second state.

One end of the side bar 245 is fixed to the start rotary body 241. Here, "one end of the side bar is fixed to the start rotary body" is a meaning including an example in which one end of the side bar 245 is directly fastened to the start rotary body 241 and an example in which one end of the side bar 245 is fastened to another member fastened to the start rotary body 241. In this embodiment, the lower end of the side bar 245 is directly fastened to the start rotary body 241.

The other end of the side bar 245 is connected to the motion member 247. Force is applied to the other end of the side bar 245 according to the operation of the motion member 247.

The side bar 245 is disposed so as to extend through the rotary bodies 241, 242, and 243. The side bar 245 is disposed so as to extend through a one-side edge portion of each of the rotary bodies 241, 242, and 243 in the first state and the second state. The side bar 245 is disposed so as to extend through the end rotary body 243. The extension 244c is disposed so as to extend through the middle rotary body 242.

A plurality of side bars 245 may be provided. The side bars 245 may include a first side bar 245-1 and a second side bar 245-2, which are disposed so as to be spaced apart from each other in the state in which the articulation rotation axis Oj is disposed therebetween. The first side bar 245-1 and the second side bar 245-2 are disposed so as to be symmetric with respect to the central parts of the rotary bodies 241, 242, and 243. The center bar 244 is disposed between the pair of side bars 245-1 and 245-2. The first side bar 245-1 is disposed at a position spaced apart from the articulation rotation axis Oj in the positive Y-axis direction. The second side bar 245-2 is disposed at a position spaced apart from the articulation rotation axis Oj in the negative Y-axis direction. In another embodiment, although not shown, the present invention may be embodied only using a single side bar disposed so as to be spaced apart from the articulation rotation axis Oj in any one of the positive Y-axis direction and the negative Y-axis direction.

The side bar 245 includes an upper-end connection portion 245a connected to the motion member 247. The upper-end connection portion 245a is coupled to the end of a rotary arm 247b. The upper-end connection portion 245a is coupled to the end of the rotary arm 247b via a sub rotary portion 247c. The upper-end connection portion 245a may be rotatably coupled to the end of the rotary arm 247b. The upper-end connection portion 245a is formed at the upper end of the side bar 245.

The upper-end connection portion 245a includes a lower-end connection portion 245b fixed to the start rotary body 241. The lower-end connection portion 245b is fastened to the side bar fixing portion 241q of the start rotary body 241. The lower-end connection portion 245b is formed at the lower end of the side bar 245.

The side bar 245 includes a passage portion 245c extending to interconnect the upper-end connection portion 245a and the lower-end connection portion 245b. The passage portion 245c extends in the upward-downward direction in the first state. The passage portion 245c is formed such that the Y-axis length of the passage portion is shorter than the X-axis length of the passage portion. The passage portion 245c is disposed so as to extend through the rotary bodies 242 and 243. The passage portion 245c is disposed so as to extend through the end rotary body 243. The passage portion 245c is disposed so as to extend through the middle rotary body 242. The passage portion 245c is made of a flexible material such that the passage portion can be elastically bent in the second state.

The bending assembly 240 includes a fixing member 246 fixed to the end rotary body 243. The fixing member 246 fixes the other end (the upper end) of the center bar 244. The fixing member 246 is provided at the central part thereof with a center bar fixing portion 246a for fixing the center bar 244. A hole is formed through the center bar fixing portion 246a in the upward-downward direction. The extension 244c of the center bar 244 extends through the hole. The fixing member 246 includes a side bar penetration portion 246b, through which the side bar 245 extends. A first side bar penetration portion 246b-1, through which the first side bar 245-1 extends, and a second side bar penetration portion 246b-2, through which the second side bar 245-2 extends, are formed in the fixing member 246. The side bar 245 extends through the fixing member 246 in the upward-downward direction. The fixing member 246 fixes the motion frame 248. The fixing member 246 includes a motion frame fixing portion 246c to which a fixing portion 248d of the motion frame 248 is fastened. A plurality of motion frame fixing portions 246c may be disposed so as to be symmetric with respect to the center bar fixing portion 246a. The fixing member 246 is fixed to the end rotary body 243. The fixing member 246 includes an end rotary body fixing portion 246d fastened to the fastening portion 243a of the end rotary body 243. A plurality of end rotary body fixing portions 246d may be arranged in the circumferential direction. The upper end of the main case 210 is fixed to the fixing member 246. The fixing member 246 includes a main case fixing portion 246e fastened to the first fixing portion 210a of the main case 210. The main case fixing portion 246e is disposed farther away than the end rotary body fixing portion 246d in the centrifugal direction. A plurality of main case fixing portions 246e may be arranged in the circumferential direction.

The bending assembly 240 includes a motion member 247 configured to pull or push the other end (the upper end) of the side bar 245 in the extension direction of the side bar 245. The motion member 247 is configured to pull or push the other end of the side bar 245 from or to the end rotary body 243 in the extension direction of the side bar 245. The motion member 247 may pull the other end of the side bar 245 such that the other end of the side bar 245 becomes far away from the upper surface of the end rotary body 243, or may push the other end of the side bar 245 such that the other end of the side bar 245 becomes close to the upper surface of the end rotary body 243.

In the first state, the extension direction of the side bar 24 is the Z-axis direction, and the motion member 247 is configured to pull or push the other end of the side bar 245 in the Z-axis direction. In this embodiment, the motion member 247 is configured to pull or push the upper end of the side bar 245 in the upward-downward direction. When the motion member 247 pulls or pushes the side bar 245, the guides 242q and 243q guide movement of the side bar 245 relative to the rotary bodies. In addition, the guides 242q and 243q serve to prevent buckling of the side bar 245 when the motion member 247 pushes the side bar 245.

The motion member 247 is configured to push one of the first side bar 245-1 and the second side bar 245-2 when pulling the other.

Referring to FIG. 21a, the motion member 247 pulls the first side bar 245-1 in the extension direction of the first side bar 245-1 while pushing the second side bar 245-2 in the extension direction of the second side bar 245-2. In this case, the rotary bodies 241, 242, and 243 are inclined in the positive Y-axis direction.

Referring to FIG. 21b, the motion member 247 pushes the first side bar 245-1 in the extension direction of the first side bar 245-1 while pulling the second side bar 245-2 in the extension direction of the second side bar 245-2. In this case, the rotary bodies 241, 242, and 243 are inclined in the negative Y-axis direction.

The start rotary body 241 is disposed at one side of the rotary bodies, and the end rotary body 243 is disposed at the other side of the rotary bodies. The motion member 247 is disposed at the other side of the rotary bodies. The bending assembly 240 includes the motion member 247. The motion member 247 is coupled to the end rotary body 243. The motion member 247 is coupled to the end rotary body 243 via the motion frame 248 and the fixing member 246.

The motion member 247 includes a motion shaft 247a configured to be rotatable about a motion rotation axis Oa. The motion rotation axis Oa extends parallel to the articulation rotation axis Oj. The motion rotation axis Oa extends in the X-axis direction.

The motion rotation axis Oa moves together with the motion frame. Specifically, the motion frame 248, which is coupled to the end rotary body 243, is inclined according to the bending operation of the bending assembly 240. At this time, the motion rotation axis Oa is inclined together with the motion frame 248.

The motion shaft 247a is rotatably coupled to the motion frame 248. The motion shaft 247a is rotatably coupled to the motion frame 248 via a driving shaft 249. The motion shaft 247a is rotated together with the driving shaft 249. The motion shaft 247a is fixed to the driving shaft 249, and the driving shaft 249 is rotatably disposed at the motion frame 248. The driving shaft 249 is a member extending along the motion rotation axis Oa.

The motion member 247 includes a rotary arm 247b, one end of which is fixed to the motion shaft 247a and the other end of which is coupled to the other end of the side bar 245. The rotary arm 247b protrudes from the motion shaft 247a to one side. The rotary arm 247b protrudes from the motion shaft 247a in the Y-axis direction.

A plurality of rotary arms 247b-1 may be provided. The rotary arms 247b include a first rotary arm 247b-1, one end of which is fixed to the motion shaft 247a and the other end of which is coupled to the first side bar 245-1. The rotary arms 247b include a second rotary arm 247b-1, one end of which is fixed to the motion shaft 247a and the other end of which is coupled to the second side bar 245-2.

The rotary arm 247b and the side bar 245 are rotatably coupled to each other. The motion member 247 includes a sub rotary portion 247c for interconnecting the rotary arm 247b and the side bar 245. The sub rotary portion 247c rotatably couples the other end of the side bar 245 to the rotary arm 247b. The sub rotary portion 247c is provided at the end of the rotary arm 247b. The sub rotary portion 247c is disposed so as to be spaced apart from the motion shaft 247a. The sub rotary portion 247c is coupled to the rotary arm 247b so as to be rotatable about a sub rotation axis Ob. The sub rotation axis Ob extends parallel to the motion rotation axis Oa. The sub rotation axis Ob extends in the X-axis direction.

A plurality of sub rotary portions 247c may be provided. The sub rotary portions 247c include a first sub rotary portion 247c-1 for interconnecting the first rotary arm 247b-1 and the first side bar 245-1. The sub rotary portions 247c include a second sub rotary portion 247c-2 for interconnecting the second rotary arm 247*b*-2 and the second side bar 245-2. The first sub rotary portion 247*c*-1 is coupled to the first rotary arm 247*b*-1 so as to be rotatable about a first sub rotation axis Ob1. The second sub rotary portion 247*c*-2 is coupled to the second rotary arm 247*b*-2 so as to be rotatable about a second sub rotation axis Ob2. The first sub rotation axis Ob1 and the second sub rotation axis Ob2 extend parallel to each other.

The sub rotary portion 247*c* includes an arm connection portion 247*c*1 coupled to the rotary arm 247*b*. The arm connection portion 247*c*1 is formed in the shape of a plate having a thickness in the X-axis direction. A rotation hole 247*h* is formed in one of the arm connection portion 247*c*1 and the rotary arm 247*b*, and a protrusion, which is inserted into the rotation hole 247*h*, is formed on the other, whereby the sub rotary portion 247*c* and the rotary arm 247*b* are rotatable relative to each other. In this embodiment, the rotation hole 247*h* is formed in the end of the rotary arm 247*b*, and the protrusion, which is inserted into the rotation hole 247*h*, is formed on the arm connection portion 247*c*1. The sub rotary portion 247*c* includes a side bar connection portion 247*c*2 coupled to the side bar 245. The side bar connection portion 247*c*2 is formed in the shape of a plate having a thickness in the Y-axis direction. A fastening hole (not shown) is formed in the side bar connection portion 247*c*2. The upper end of the side bar 245 is fastened to the side bar connection portion 247*c*2 by a fastening member.

Referring to FIG. 13, the bending assembly 240 includes a motion frame 248 fixed to the end rotary body 243. The motion frame 248 is fixed to the end rotary body 243 by the fixing member 246. The motion frame 248 is operated together with the end rotary body 243. The motion frame 248 rotatably supports the motion member 247.

The motion frame 248 includes a first part 248*a* disposed in the positive X-axis direction on the basis of the motion shaft 247*a*. The motion frame 248 includes a second part 248*b* disposed in the negative X-axis direction on the basis of the motion shaft 247*a*. The first part 248*a* and the second part 248*b* are disposed so as to be spaced apart from each other. The motion frame 248 includes a reinforcement portion 248*c* for interconnecting and fixing the first part 248*a* and the second part 248*b*. The reinforcement portion 248*c* extends in the X-axis direction. The motion frame 248 includes a fixing portion 248*d* fastened to the fixing member 246. The fixing portion 248*d* is disposed at the lower end of the motion frame 248.

The bending assembly 240 includes a driving shaft 249 configured to be rotated by the motion driving unit 62. The driving shaft 249 is rotated about the motion rotation axis Oa. The driving shaft 249 is fastened to the motion shaft 247*a* by a fastening member, such as a pin. The driving shaft 249 is rotatably disposed at the motion frame 248. The driving shaft 249 moves together with the motion frame 248. The driving shaft 249 may be disposed so as to extend through at least one of the first part 248*a* or the second part 248*b*. The driving shaft 249 extends in the X-axis direction. The driving shaft 249 is connected to a driving arm assembly 62*b*. The driving shaft 249 is fixed to a driven arm 62*b*3 so as to be rotated together with the driven arm 62*b*3.

The main body 200 includes a support frame 260 coupled to the upper end of the bending assembly 240. The support frame 260 is fixed to the motion frame 248. The support frame 260 may be disposed at the upper side of the motion frame 248. The support frame 260 moves together with the end rotary body 243.

The support frame 260 supports the display body 300 such that the display body is rotatable about the second spin rotation axis Os2. The support frame 260 may support the second spin driving unit 63. The support frame 260 may support the motion driving unit 62.

The support frame 260 includes a display body support portion 261 for supporting the display body 300. In this embodiment, the second spin driving unit 63 is fixed to the display body support portion 261, and the motor shaft 63*b* is fixed to the display body 300. In another embodiment, the second spin driving unit 63 may be disposed at the display body 300, and the display body support portion 261 may be fixed to the motor shaft 63*b*.

A motor shaft hole 261*a*, through which the motor shaft 63*b* of the second spin driving unit 63 extends, is formed in the display body support portion 261. The display body support portion 261 is formed in the shape of a plate having a thickness in the upward-downward direction.

The support frame 260 includes a motor driving unit support portion 263 for supporting the motion driving unit 62. A motor 62*a* is fixed to the motor driving unit support portion 263. The motor driving unit support portion 263 is formed in the shape of a plate having a thickness in the X-axis direction.

The communication robot 1 includes a motion driving unit 62 for supplying rotational force to the motion member 247. The motion driving unit 62 provides driving force necessary to rotate the rotary arm. The motion driving unit 62 includes a motor 62*a* and a driving arm assembly 62*b* for transmitting driving force of the motor 62*a* to the motion member 247.

The driving arm assembly 62*b* transmits driving force of the motor 62*a* to the driving shaft 249. The driving arm assembly 62*b* includes a plurality of arms. The arms of the driving arm assembly 62*b* are rotatably coupled to each other. The arms of the driving arm assembly 62*b* are coupled to each other so as to be rotatable about a rotation axis extending in the X-axis direction.

In this embodiment, the driving arm assembly 62*b* includes a driving arm 62*b*1 fixed to a shaft of the motor 62*a*, a connection arm 62*b*2, one end of which is rotatably coupled to the driving arm 62*b*1, and a driven arm 62*b*3 rotatably connected to the other end of the connection arm 62*b*2. The driving arm 62*b*1 is formed so as to extend in a direction far away from the shaft of the motor 62*a*, and the connection arm 62*b*2 is connected to the distal end of the driving arm 62*b*1. The driven arm 62*b*3 is fixed to one end of the driving shaft 249 so as to be rotated together with the driving shaft 249. The driven arm 62*b*3 is formed so as to extend in a direction far away from the motion rotation axis Oa, and the connection arm 62*b*2 is connected to the distal end of the driven arm 62*b*3.

Referring to FIGS. 21*a* and 21*b*, when the shaft of the motor 62*a* and the driving arm 62*b*1 are rotated, the end of the driving arm 62*b*1 pulls or pushes one end of the connection arm 62*b*2 to one side, when viewed in the positive X-axis direction. The position of the other end of the connection arm 62*b*2 is changed by the pulled end of the connection arm 62*b*2, whereby the driven arm 62*b*3, coupled to the other end of the connection arm 62*b*2, is rotated. When the driven arm 62*b*3 is rotated, the driving shaft 249 is also rotated.

Referring to FIG. 21*a*, when the driving arm 62*b*1 is rotated in the clockwise direction, the connection arm 62*b*2 is moved in the negative Y-axis direction to pull the end of the driven arm 62*b*3 in the negative Y-axis direction, and the driven arm 62*b*3 and the driving shaft 249 are rotated in the counterclockwise direction. At this time, the motion member 247 is rotated together with the driving shaft to pull the first side bar 245-1 in the positive Z-axis direction and to push the second side bar 245-2 in the negative Z-axis direction.

Referring to FIG. 21*b*, when the driving arm 62*b*1 is rotated in the counterclockwise direction, the connection arm 62*b*2 is moved in the positive Y-axis direction to push the end of the driven arm 62*b*3 in the positive Y-axis direction, and the driven arm 62*b*3 and the driving shaft 249 are rotated in the clockwise direction. At this time, the motion member 247 is rotated together with the driving shaft to push the first side bar 245-1 in the negative Z-axis direction and to pull the second side bar 245-2 in the positive Z-axis direction.

The communication robot 1 includes a second spin driving unit 63 for providing driving force necessary for the second spin operation. In this embodiment, the second spin driving unit 63 is disposed at the main body 200. The second spin driving unit 63 includes a motor 63*a*. The motor 63*a* is fixed to the support frame 260. The second spin driving unit 63 includes a motor shaft 63*b* connected to a rotation axis of the motor 63*a*. The motor shaft 63*b* is disposed on the second spin rotation axis Os2 so as to be rotatable. One end of the motor shaft 63*b* is coupled to the motor 63*a*, and the other of the motor shaft is coupled to the display body 300.

Hereinafter, the construction of the display body 300 will be described with reference to FIGS. 4, 5*a*, 5*b*, 9, and 10. The display body 300 is rotatably supported by the main body 200. The display body 300 is supported by the support frame 260. The display body 300 is configured to be rotated about the second spin rotation axis Os2. The display body 300 is supported by the support frame 260 so as to be rotatable about the second spin rotation axis Os2 in the leftward-rightward direction.

The display body 300 includes the display case 310. A front surface 311 is disposed at the front of the display case 310. The front surface 311 may be flat. The display body 300 includes a display 301 for outputting an image. The display 301 is disposed at the front surface 311.

The display body 300 includes a display frame 320 rotatably coupled to the main body 200. The display frame 320 is fixed to the motor shaft 63*b*. The display case 310 is fixed to and supported by the display frame 320. The display frame 320 may support various components in the display case 310 (e.g. the speaker, the display panel, and the microphone).

The invention claimed is:

1. A communication robot comprising:
    a support body disposed at a lower side;
    a main body positioned above the support body and rotatably coupled to the support body about a first spin rotation axis extending in a vertical direction; and
    a display body opposite to the support body with respect to the main body and rotatably coupled to the main body about a second spin rotation axis extending in the vertical direction, the display body being configured to output an image,
    wherein the main body comprises a bending assembly extending from the support body to the display body and connecting the support body and the display body;
    wherein the bending assembly is bendable in a direction crossing the vertical direction with respect to the support body,
    wherein the second spin rotation axis is inclined relative to the first spin rotation axis when the bending assembly is bent with respect to the support body.

2. The communication robot according to claim 1, wherein
    an upper part of the main body is configured to be bent with respect to a lower part of the main body according to the bending of the bending assembly with respect to the lower part; and
    the support body is coupled to the lower part.

3. The communication robot according to claim 1, wherein the main body is configured such that:
    a bending direction of the bending assembly relative to the support body is limited; and
    the bending direction of the bending assembly relative to the support body is changed when the main body is rotated about the first spin rotation axis.

4. The communication robot according to claim 1, wherein the communication robot is configured to have a first state, in which the first spin rotation axis and the second spin rotation axis are disposed in parallel, and a second state, in which the second spin rotation axis is inclined relative to the first spin rotation axis according to the bending of the bending assembly with respect to the support body.

5. The communication robot according to claim 4, wherein, in the first state, the first spin rotation axis and the second spin rotation axis are disposed on a single straight line.

6. The communication robot according to claim 5, comprising a controller configured to perform control such that the main body and the display body are rotated in opposite directions at identical angular velocities in the first state.

7. The communication robot according to claim 5, wherein the main body is configured such that the bending direction of the bending assembly relative to the support body is limited.

8. The communication robot according to claim 1, comprising:
    a direction sensor configured to sense a direction of a user relative to the communication robot; and
    a controller configured to perform control such that at least one of the main body or the display body is rotated in order to change an image output direction of the display body to the direction of the user sensed by the direction sensor.

9. The communication robot according to claim 8, wherein the controller performs control such that the main body performs the bending of the bending assembly with respect to the support body in order to change the image output direction of the display body to the direction of the user sensed by the direction sensor.

10. The communication robot according to claim 1, wherein the main body comprises:
    a spin assembly coupled to the support body so as to be rotatable about the first spin rotation axis and to which a lower end of the bending assembly coupled; and
    a support frame coupled to an upper end of the bending assembly, the support frame being configured to support the display body such that the display body is rotatable about the second spin rotation axis.

11. The communication robot according to claim 1, wherein
    the support body comprises a main body support unit configured to support the main body,
    the main body comprises a spin frame coupled to the support body so as to be rotatable about the first spin rotation axis,
    one of the main body support unit and the spin frame forms a plane perpendicular to the first spin rotation axis, and the other of the main body support unit and the spin frame comprises a roller disposed so as to roll along the plane.

12. The communication robot according to claim 1, wherein the main body comprises a main case, which defines an external appearance thereof, and the main case is configured to rotate about the first spin rotation axis together with the main body and to be bent according to the bending of the bending assembly with respect to the support body.

13. The communication robot according to claim 1, comprising a remote control module disposed at the display body, the remote control module being configured to transmit an optical signal for controlling a predetermined peripheral device.

* * * * *